United States Patent [19]

Honjo et al.

[11] Patent Number: 4,727,398

[45] Date of Patent: Feb. 23, 1988

[54] AUTOMATIC ORIGINAL FEEDING APPARATUS

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 632,214

[22] Filed: Jul. 18, 1984

[30] Foreign Application Priority Data

| Jul. 22, 1983 | [JP] | Japan | 58-134832 |
| Jul. 22, 1983 | [JP] | Japan | 58-134833 |
| Jul. 22, 1983 | [JP] | Japan | 58-134834 |
| Jul. 22, 1983 | [JP] | Japan | 58-134835 |
| Jul. 22, 1983 | [JP] | Japan | 58-134836 |

[51] Int. Cl.[4] ........................................... G03G 15/00
[52] U.S. Cl. .......................... 355/3 SH; 355/14 SH; 355/23; 271/3.1
[58] Field of Search .............. 355/3 SH, 14 SH, 14 C, 355/23, 24; 271/3, 3.1, 4, 8.1, 9, 65, 256, 264, 265

[56] References Cited

U.S. PATENT DOCUMENTS

| Re. 27,976 | 4/1974 | Sahley | 355/64 |
| 3,556,512 | 1/1971 | Fackler | 271/4 |
| 3,888,579 | 6/1975 | Rodek et al. | 355/14 |
| 4,089,515 | 5/1978 | Stange et al. | 355/24 X |
| 4,099,150 | 7/1978 | Connin | 355/3 |
| 4,140,387 | 2/1979 | Gustafson | 355/14 |
| 4,158,500 | 6/1979 | DiFrancesco et al. | 355/14 |
| 4,169,674 | 10/1979 | Russel | 355/14 |
| 4,176,945 | 12/1979 | Holzhauser et al. | 355/23 |
| 4,278,344 | 7/1981 | Sahay | 355/23 X |
| 4,456,237 | 6/1984 | Buddendeck | 271/3.1 |
| 4,544,148 | 10/1985 | Kitajima et al. | 271/3.1 |

FOREIGN PATENT DOCUMENTS 0078166 5/1983 European Pat. Off. .
52-32333 3/1977 Japan .

Primary Examiner—A. T. Grimley
Assistant Examiner—J. Pendegrass
Attorney, Agent, or Firm—Fitzpatrick, Cella, Harper & Scinto

[57] ABSTRACT

An automatic original feeder for automatically feeding two sides of an original document to a reading position for image recording, and an image recording apparatus provided with such a feeder. The automatic original feeder of the present invention includes a supporting member for supporting the originals, a feed device for separating and feeding the originals on the support member one by one, a guide mechanism for inverting an even number of times, the top side and bottom sides of the original fed by the feed means to guide a first side of the original to the reading position, a device for discharging the original, after the first side is read, from a direction the same as that through which the original is guided to the reading position, a device for inverting the top sides and bottom side of the discharged original and feeding the second side of the original to the reading position, and a device for returning the original, after the reading of the second side thereof, to the supporting member from a direction the same as that through which the original is fed to the reading position.

10 Claims, 56 Drawing Figures

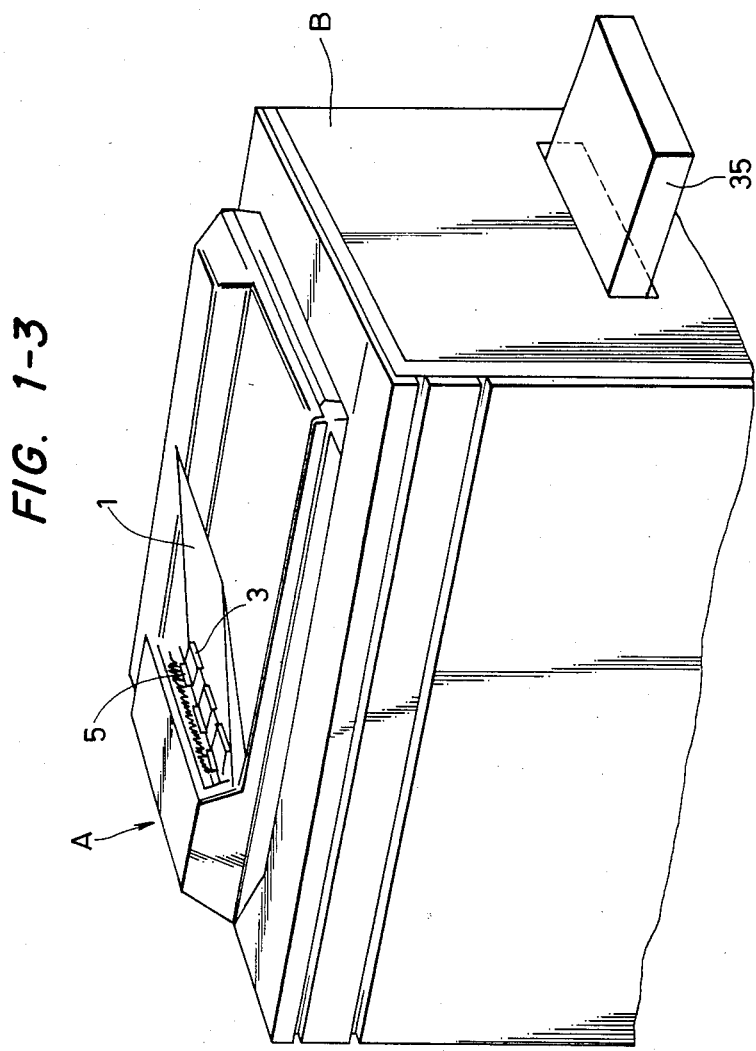

FIG. 8-1
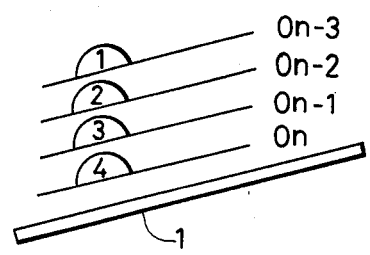
FIG. 8-2
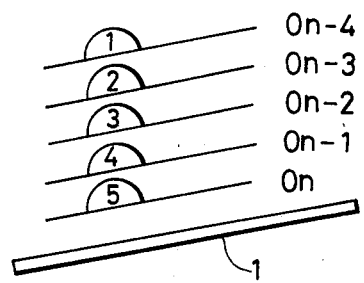
FIG. 9-1
(1)
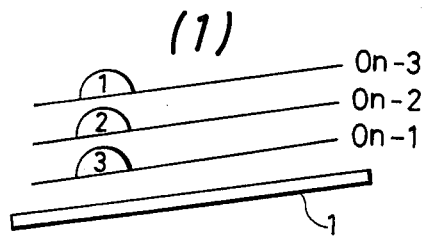
(2)
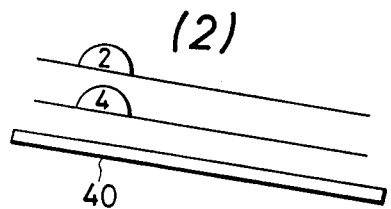
(3)
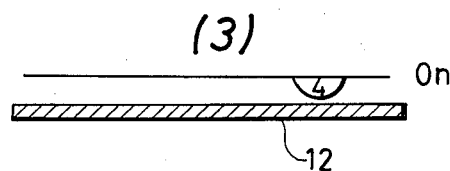

FIG. 9-2
(1)
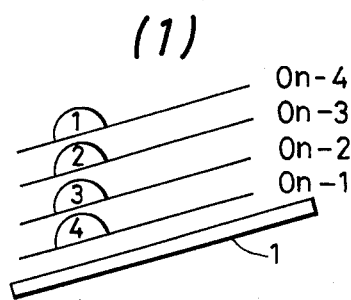
(2)
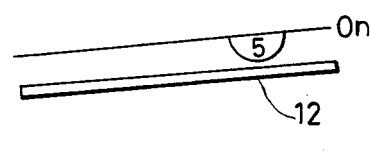
(3)
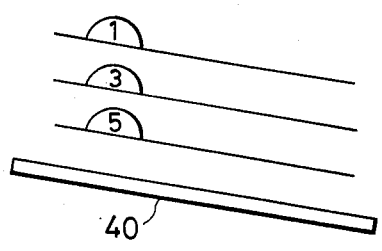
FIG. 10-1
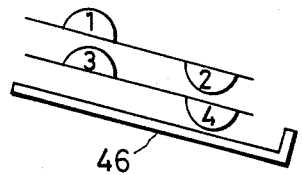
FIG. 10-2
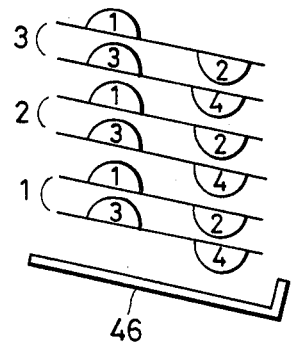
FIG. 10-3
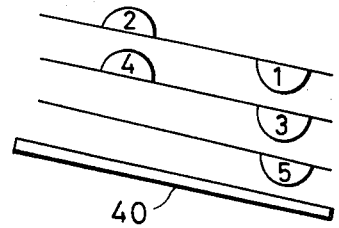

FIG. 17

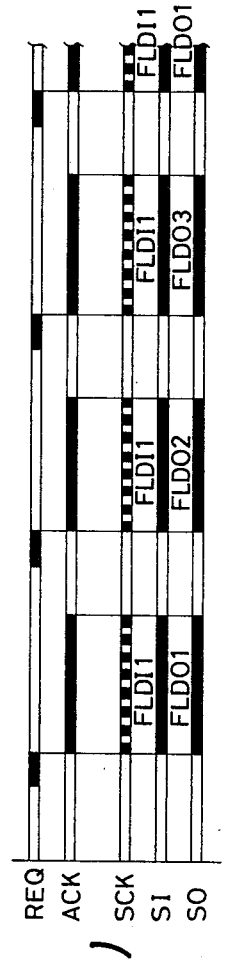

(3)

| FLD | NO. | SIGNAL | |
|---|---|---|---|
| FLDO3 | 7 | SIGNAL | |
| | 6 | FIELD DESIGNATION | '1' '0' |
| | 5 | JAM SIGNAL | |
| | 4 | DOOR OPEN SIGNAL | |
| | 3 | | MSB |
| | 2 | ORIGINAL SHEET NUMBER SIGNAL | |
| | 1 | | |
| | 0 | | |

SO

| FLD | NO. | SIGNAL | |
|---|---|---|---|
| FLDO2 | 7 | SIGNAL | |
| | 6 | FIELD DESIGNATION | '0' '1' |
| | 5 | CYCLE END SIGNAL | |
| | 4 | ORIGINAL DETECTION SIGNAL | |
| | 3 | ORIGINAL SHEET NUMBER SIGNAL | |
| | 2 | | |
| | 1 | | |
| | 0 | | LSB |

| FLD | NO. | SIGNAL | |
|---|---|---|---|
| FLDO1 | 7 | SIGNAL | |
| | 6 | FIELD DESIGNATION | '0' '0' |
| | 5 | ORIGINAL FEED FINISH SIGNAL | |
| | 4 | OPERATING SIGNAL | |
| | 3 | DRIVING SIGNAL | |
| | 2 | ORIGINAL SIZE SIGNAL ** | Ⓐ |
| | 1 | | Ⓑ |
| | 0 | | Ⓒ |

**ORIGINAL SIZE SIGNAL
1······A4
2······A3
3······B5
4······B4
5······A4R
6······B5R (2)
S1

| FLD | NO. | SIGNAL |
|---|---|---|
| FLDI1 | 7 | FIELD DESIGNATION '0' |
| | 6 | ORIGINAL FEED SIGNAL |
| | 5 | ORIGINAL DISCHARGE SIGNAL |
| | 4 | |
| | 3 | OPERATION COMMAND SIGNAL * |
| | 2 | |
| | 1 | |
| | 0 | |

*OPERATION COMMAND SIGNAL
0····· FDFF MODE
1····· FDRF MODE
2····· RDFF MODE
3····· RDRF MODE
4····· TURN OVER MODE (1) REQ ACK SCK S1 SO

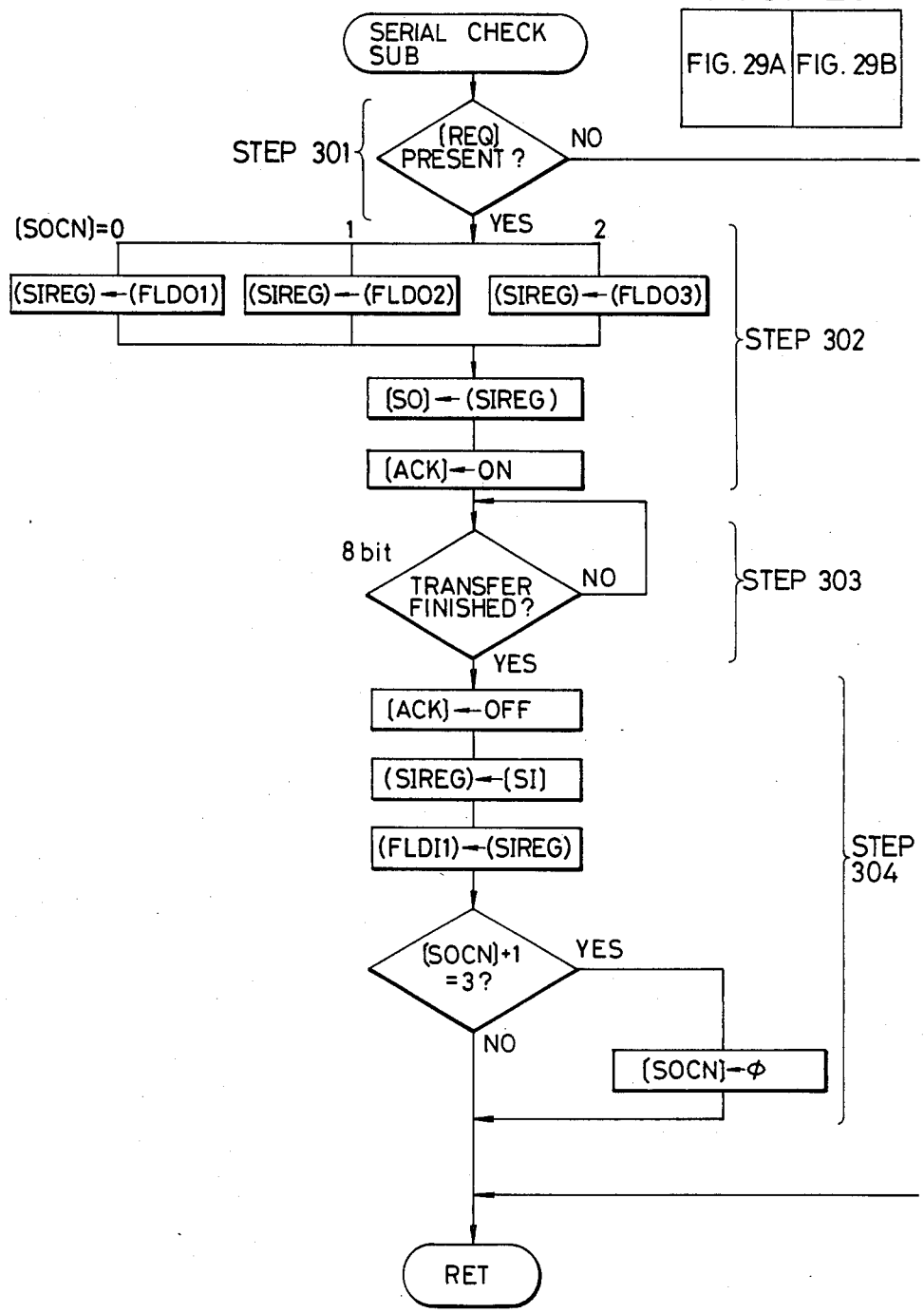

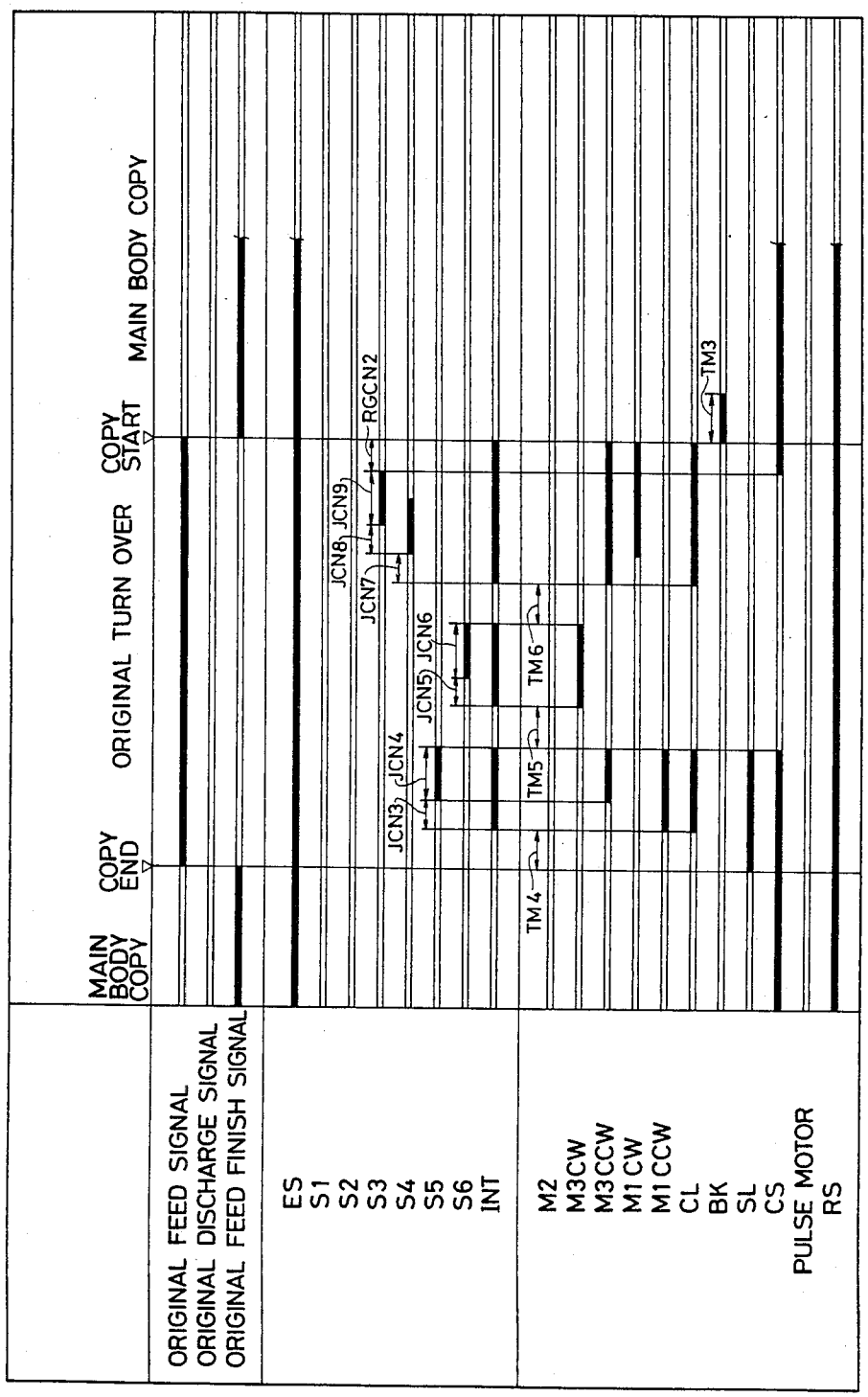

AUTOMATIC ORIGINAL FEEDING APPARATUS

BACKGROUND OF THE INVENTION

1. Field of the Invention

The present invention relates to an automatic original feeding apparatus adapted for use in image recording apparatus such as a electrophotographic copier, a laser beam printer or an ink jet printer, and more particularly to an automatic original feeding apparatus capable of automatically feeding two sides of originals having images on both sides thereof to an image reading position for image recording, and also relates to an image recording apparatus provided with such an automatic original feeding apparatus.

2. Description of the Prior Art

There are already known various automatic original feeding apparatus capable of automatically feeding both sides of originals to an image reading position for image recording.

For example, the automatic original feeding apparatus disclosed in U.S. Pat. Nos. 4,099,150, 4,140,387 and 4,158,500 show splendid performance as they are capable not only of automatically feeding two sides of the originals to the image reading position but also of returning the originals after image reading to the original feeding position in the same order of pages as that prior to the feeding. However, the apparatus disclosed in U.S. Pat. Nos. 4,099,150 and 4,140,387 require another storage unit in addition to the original storage, and involve a large dimension of the entire apparatus and a complicated transport control for the originals. Though the apparatus disclosed in U.S. Pat. No. 4,158,500 requires only one storage for the originals, the drive system is bulky and complex since the original is discharged from a side of the platen opposite to the feeding side.

SUMMARY OF THE INVENTION

An object of the present invention is to provide an automatic original feeding apparatus capable of automatically feeding both sides of the originals to an image reading position.

Another object of the present invention is to provide an automatic original feeding apparatus capable of returning the originals, after image reading, to the original supporting unit from which the originals are fed.

Still another object of the present invention is to provide an automatic original feeding apparatus capable of returning the originals, after image reading, to the original supporting unit from which the originals are fed, in the same order of pages as that prior to the feeding.

Still another object of the present invention is to provide an automatic original feeding apparatus allowing one to obtain records arranged in the order of pages by stacking one-sided originals with the image bearing faces upwards.

Still another object of the present invention is to provide an automatic original feeding apparatus with a compact driving system.

Still another object of the present invention is to provide an automatic original feeding apparatus compactly mountable on an image recording apparatus such as an electrophotographic copier, a laser beam printer or an ink jet printer.

Still another object of the present invention is to provide an image recording apparatus provided with the aforementioned automatic original feeding apparatus.

Still another object of the present invention is to provide a compact automatic original feeding apparatus.

Still another object of the present invention is to provide an automatic original feeding apparatus with simplified transport control for the originals.

BRIEF DESCRIPTION OF THE DRAWINGS

FIG. 1-1 is a cross-sectional view of an image forming system comprising a two-side original feeding apparatus, a two-side copier, and a sorter;

FIG. 1-2 is a schematic view of a discharge tray;

FIG. 1-3 is a perspective view of an image forming system comprising a two-side original feeding apparatus and a two-side copier;

FIG. 2 is a cross-sectional view showing the driving system of the two side original feeding apparatus;

FIGS. 3 to 7, 8-1, 8-2, 9-1, 9-2, 10-1 to 10-3, 11, 12-1, 12-2 and 13-1 to 13-3 are schematic views showing the states of originals or copy sheets;

FIG. 17 is a set of charts showing the principle of a serial transfer process;

FIGS. 31 to 39 are timing charts in various modes of the two-side original feeding apparatus.

DESCRIPTION OF THE PREFERRED EMBODIMENT

Now the present invention will be clarified in detail by description of one embodiment. In said embodiment the automatic original feeding apparatus of the present invention is mounted on a two-side electrophotographic copier, but it is to be noted that the present invention is not limited to such embodiment. For example, the present invention is likewise effective when the feeding apparatus is mounted on a one-side copier. Also the present invention is not limited to the copier but also applicable generally to image recording apparatus, including laser beam printers and ink jet printers. Also in said embodiment the image reading position is represented by a platen glass for exposing the original image in the a copier, but in case of other image recording apparatus said position can for example be an exposure position, in the case of a facsimile apparatus, for forming a reflective image for input to an image sensor for image reading. Also the original need not necessarily be of paper but can be composed of a plastic sheet or any other material of a thickness allowing transportation by known transport means utilizing rollers, belts or pneumatic force.

Figures 1, 2:
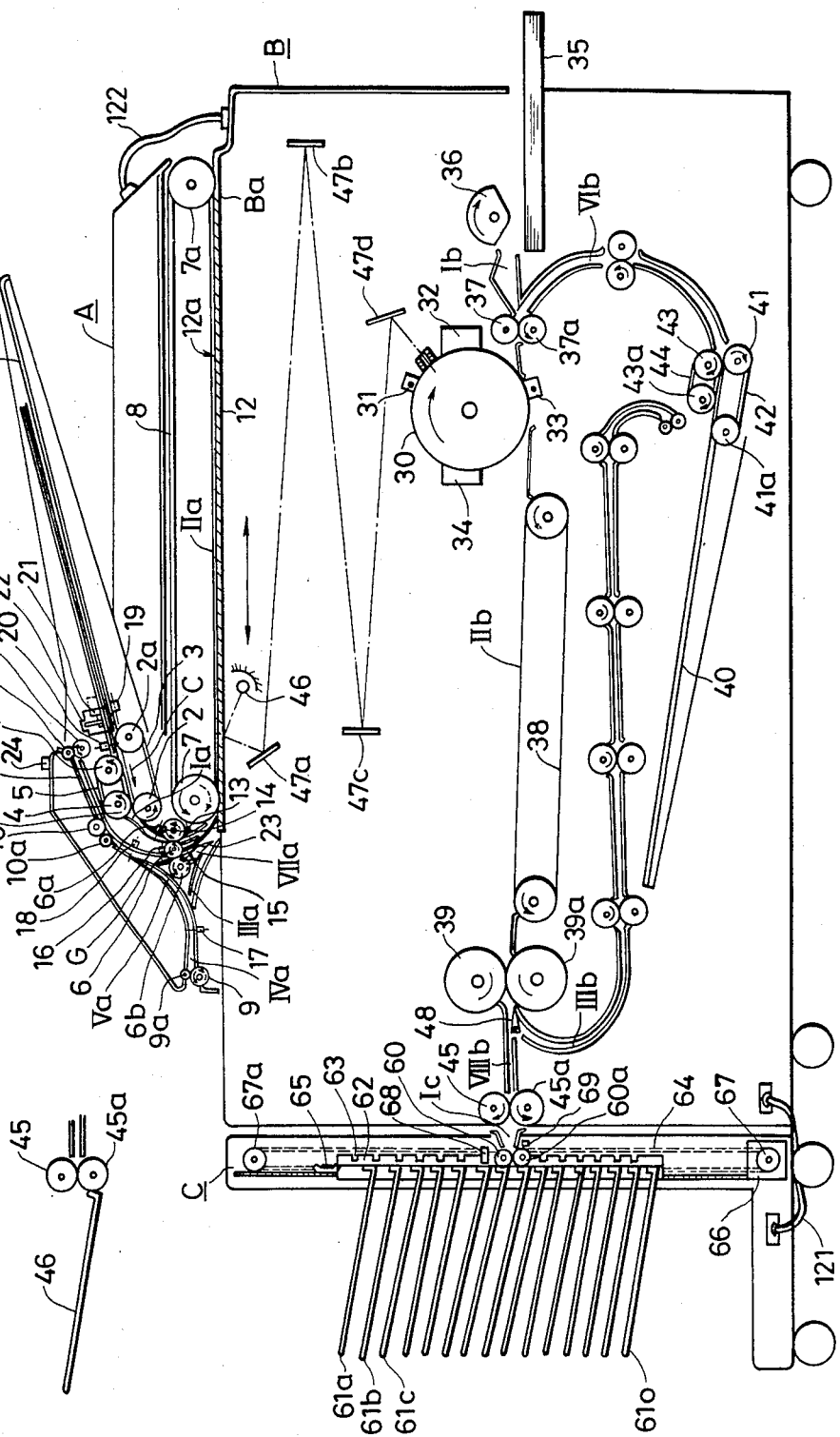
Figure 2:
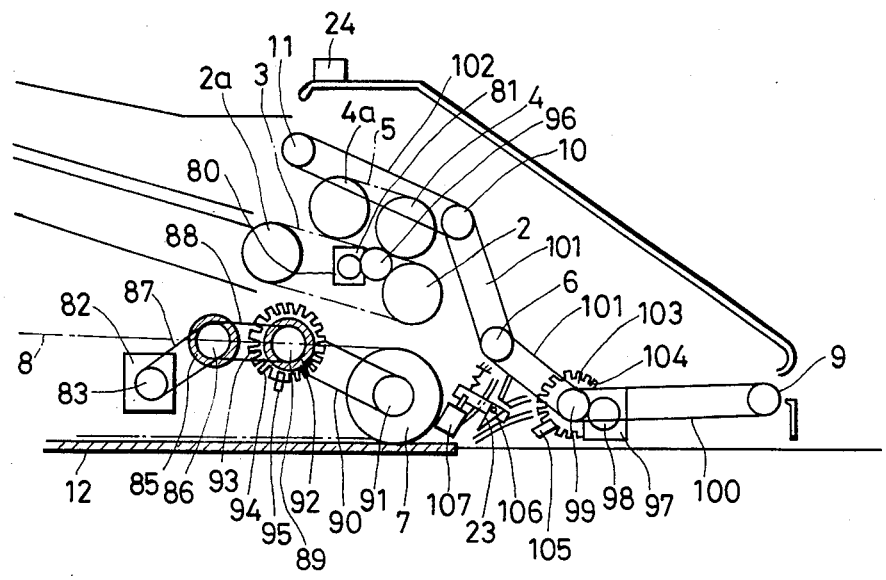
Figure 3:
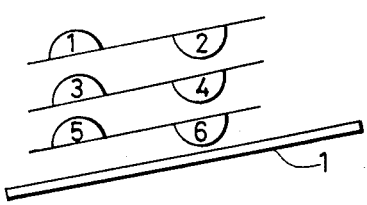

FIG. 1-1 is a longitudinal cross-sectional view showing schematic structure of a two-side copying apparatus equipped with a two-side original feeding apparatus representing an embodiment of the present invention. FIG. 1-2 is a lateral view of a discharge tray, and FIG. 1-3 is a schematic perspective view of the apparatus shown in FIG. 1-1.

The copier of the present embodiment is principally composed of a two side original feeding apparatus A, a copier body B incorporating a copy process device, and a sorter C for sorting the copy sheets, wherein the feeding apparatus A is placed on the upper plate of the casing of the copier B.

(A) Two-Side Original Feeding Apparatus A

There are provided an original carrier tray 1 for supporting the originals; a feeding belt driving roller 2; a driven roller 2a which is linked with said driving roller 2 through a feeding belt 3 rotated in a direction C; a separating belt driving roller 4 and a driven roller 4a linked with said driving roller 4 through a separating belt 5 rotated in a direction D. The plural sheet originals stacked on the original carrier tray are separated one by one from the bottom by means of the mutually opposed rotations of the feeding belt 3 and the separating belt 5. There are also provided a transport roller 6; runner rollers 6a, 6b maintained in contact with the transport roller 6; other transport rollers 9, 10, 11; and runner rollers 9a, 10a, 11a maintained in respective contact with the transport rollers 9, 10, 11. There are further provided a conveyor belt driving roller 7 positioned close to the left-hand end of a platen glass 12 mounted in the upper plate Ba of the casing of the copier B; a driven roller 7a positioned close to the right-hand end of said platen glass 12 and linked with said driving roller 7 through a belt 8 of which the lower surface is positioned quite close to or in contact with the upper face 12a of said platen glass; reflective photosensors 13 to 18 positioned in certain positions along the original feeding paths in order to detect the leading or trailing end of the original; a reflective photosensor ES 20 for detecting the original placed on the original carrier tray 1; and a reflective sensor RS 19 for detecting one cycle of the original stack, said sensor being turned on by a separating arm 22 when it is placed on the stacked originals by a stepping motor 21 and turned off when said arm 22 is removed by the weight thereof as the trailing end of the last original is extracted therefrom at the end of successive original feedings.

A switching finger 23 selects whether the original on the platen glass 12 is driven toward the transport roller 6 or 9.

A flexible guide G made for example of a polyester sheet is adhered at an end to the lateral wall of the sheet path in such a manner as to allow entry of the sheet from a path IVa into a path VIa but prohibit entry from said path VIa into the path IVa, thus guiding the sheet into a path VIIa.

In the following are explained sheet paths Ia–VIIa. The path Ia is provided from the vicinity of the rollers 2, 4 to the vicinity of the conveyor belt driving roller 7, while the path IIa is provided along the platen glass 12, between said glass 12 and the conveyor belt 8. The path IIIa extends to the left from the left-hand end of the platen glass 12, and is connected at the farthest end with the path IVa, which is extended from the position of the rollers 9, 9a toward the original carrier tray 1 and is connected at the farthest end with the path Va. Said path Va is connected with the path VIa extended above the original carrier tray 1. The path VIIa is extended from the left-hand end of the platen glass 12 to the path VIa partly in opposed relation to the path Ia.

(2) Copier B

There are shown a platen glass 12; a photosensitive drum 30 rotated in a direction indicated by arrow about a shaft 30a; a charger 31; a developing unit 32; a transfer charger 33; a cleaner 34; a cassette 35 for storing copy sheets; a feeding roller 36 for feeding the copy sheets one by one from said cassette; registration rollers 37, 37a; a conveyor belt 38 for feeding the copy sheet after image transfer to fixing rollers 39, 39a; an intermediate tray 40 for storing the copy sheets after copying on one side thereof; driving and driven shafts 41, 41a for a feeding belt 42; driving and driven shafts 43, 43a for a separating belt 44 for re-feeding the copy sheets stored in the intermediate tray 40 from the bottom thereof; and discharge rollers 45, 45a for discharging the copy sheet after the copying operation into the sorter C, or, if the sorter C is not connected, to a sheet tray as shown in FIG. 1-2.

(3) Sorter C

There are provided a conveyor roller 60 and a pressure roller 60a for introducing the copy sheets from the copier B into bins 61a–61o; a fixing plate 62 for the bins 61a–61o, provided with notches 63; integrally formed with said bins 61a–61o and connected through a spring 65 to a chain 64 for vertical movement by means of rollers 67, 67a connected to a motor 66; and a photosensor 68 for detecting the bin position by detecting one of the notches 63 to identify a bin facing the discharge slot. There is further provided a photosensor 69 for starting the movement of bins after a time enough for complete storage of the copy sheet into a bin from the detection of the trailing end of the sheet and to terminate the movement of the bins upon detection of a succeeding notch 63, whereby the copy sheets supplied from the copier B in the course of a continuous copying operation are sorted in successive manner into the bins.

(4) Driving Mechanism of the Two-Side Original Feeding Apparatus A

FIG. 2 is a schematic cross-sectional view, of a driving unit, wherein shown are a motor (M2) 80; a motor gear 81 for transmitting the driving force to the feeding belt driving shaft 2 and the separating belt driving shaft 4 through a gear 96; a motor (M1) 82; a motor pulley 83; combined pulleys 86 for controlling the transmission of driving force from a belt 87 to a belt 88 through a magnetic clutch (CL) 85; integrally constructed pulleys 89 for transmitting the driving force from a belt 88 to a belt 90 thereby constantly driving the roller 7 of the conveyor belt 8 through a pulley 91; a disk 93 integrally rotated with said pulleys 89 and provided with notches 94 for detecting the amount of movement of the belt 8 by means of a photosensor 95; and a magnetic brake (BK) 92 capable of instantly stopping the belt 8 when energized.

There are further shown a motor (M3) 97; a gear 98; a pulley 99; belts 100, 101, 102 for transmitting the driving force to the conveyor rollers 6, 9, 10, 11; a disk 103 rotated integrally with the pulley 99 and provided with notches 104 for detecting the amount of rotation of the conveyor rollers 6, 9, 10, 11 or the amount of movement of the original by means of a photosensor 105; and a selector finger 23 movable about a shaft 106 for guiding the original from the platen glass 12 either to the conveyor roller 6 or to the conveyor roller 9 under the control of a solenoid (SL) 107.

Now there will be given an explanation of the function of the two-side original feeding apparatus A.

(i) Case of One-Side Copying From One-Side Originals (Without Sorter)

Plural one-sided sheet originals, arranged in the order of pages, are placed on the original carrier tray 1 shown in FIG. 1-1, with the first page facing upward. Said carrier tray 1 is inclined downwards toward the feed side, whereby the stacked originals are aligned at said feed side. The stacked originals are separated and fed one by one from the bottom by means of the feeding belt 3 and the separating belt 5. The separated original passes the path Ia by means of the roller 6, 6a and is supplied through the path IIa onto the platen glass 12 with the image bearing face thereof downward by means of the conveyor belt 8. Upon detection of the rear end of said original by the sensor 14 (S2), there is initiated the counting of the notches 94 of the disk 93 (FIG. 2). The motor M1 (82) and the clutch CL (85) are turned off and the brake BK (92) is turned on, whereby the rotation of the conveyor belt 8 instantly terminated. In this manner the original is automatically set in a determined position on the platen glass 12, with the image bearing side to be exposed facing the platen glass 12. The sensor 13 (S1) (FIG. 1-1) detects whether the original is separated in correct manner, and if it does not detect the original within a determined time after the start of separation, a sheet jamming is identified and the transportation is terminated.

Upon positioning of the original on the platen glass 12 in this manner, a feed finish signal (to be explained later) is supplied to the copier B to initiate the copy operation, whereby the original is exposed by a lamp 46 and a toner image corresponding to the original image is formed on the photosensitive drum 30 according to a determined process. On the other hand a copy sheet is supplied by the feeding roller 36 from the cassette 35 to a path Ib and the above-mentioned toner image is transferred thereon by the transfer charger 33. Then the sheet passes a path IIb, then the fixing rollers 39, 39a and a path VIIIb, and finally discharged to the tray 46. On the other hand the original, after an exposure step by a halogen lamp 46, and mirrors 47a, 47b, 47c, 47d, is discharged through paths VIIa, VIa. Simultaneously a succeeding original is supplied in parallel position in the afore-mentioned function, and is positioned on the platen glass 12.

Said parallel feeding and discharge are defined as normal discharge and normal feed since both originals are merely circulated and are not inverted in the course of transportation. Upon detection, by the sensor RS (19), of a cycle of the original circulation by said normal discharge and normal-feed steps in succession, a cycle end signal (to be explained later) is supplied to the copier B to store a count of the copies. The above-described procedure is repeated until said count reaches a predetermined number, and the copies of the required number are placed on the tray 46.

After the exposure of the original on the platen glass 12, the roller 7 rotates clockwise to drive the belt 8 also clockwise, whereby the original is discharged from the platen glass from a same side of the platen glass 12 as that in the feeding, namely in a moving direction opposite to that at the feeding, and is returned, through the paths VIIa, VIa to the uppermost part of the originals stacked on the original carrier tray 1. The exposed and returned original are separated by a separating arm 22 from the originals awaiting the feeding.

(ii) Case of One-Side Copying From One-Side Originals (With Sorter)

The function is almost same as that in the above-explained case of one-side copying from one-side originals without sorter. However, in contrast to the aforementioned case without sorter C in which a normal discharge/feed operation is conducted for each exposure of the original, the exposure of each original is repeated, in the presence of the sorter C, by a number of times corresponding to the predetermined copy number and the copy sheets discharged in succession are stored in the bins 61a–61o of the sorter C. In this manner the use of the sorter C allows to obtain a predetermined number of copies in one circulation of the originals.

(iii) Case of Two-Side Copying From Two-Side Originals (Without Sorter)

Figure 4:
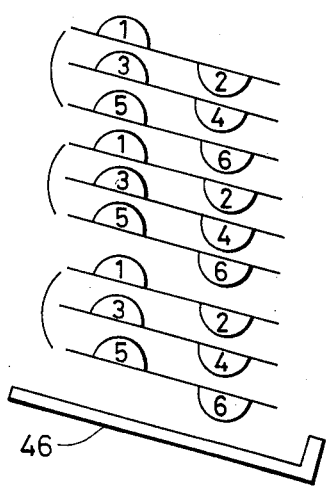
Figure 5:
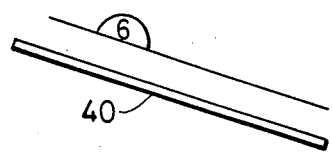

In case three sheet originals are placed on the original carrier tray 1, the order of pages will be as shown in FIG. 3, the first page being on top and the last page being at bottom. In case of obtaining three copies from each original, the completed copies after copying operation are stacked on the tray 46 as shown in FIG. 4, and the originals are stacked same as in the original state shown in FIG. 3. In the following there will be explained the operation in this case. At first an original of pages 5 and 6 is separated and fed by the belts 3, 4, and supplied by the rollers 6, 6a through the path Ia to the platen glass 12. In this the copying operation is not conducted when the original reaches the platen glass 12. The motors M1 (82) and M3 (97) shown in FIG. 2 are then reversed and the solenoid SL (107) is simultaneously energized to rotate the switching finger 23 anticlockwise thereby opening the path IIIa for the discharge. Thus the original passes paths IIIa, IVa and is transported by the conveyor rollers 9, 9a. The motor M3 (97) is deactivated upon detection of the rear end of the original by the sensor S5 (17). After the lapse of a determined time the motor M3 (97) is activated in the foreward direction to reverse the rollers 9, 9a whereby the original is subjected to a switchback and is transported through the paths Va, VIa by the rollers 10, 10a, 11, 11a. The motor M3 (97) is stopped upon detection of the rear end of the original by the sensor S6 (18), and, after the lapse of a determined time, the motor M3 (97) is again rotated in the reverse direction while the motor M1 (82) is rotated in the forward direction to reverse said rollers 10, 10a, 11, 11a, and the solenoid SL (23) is energized whereby the original is again subjected to a switchback, transported by the rollers 6, 6a through the path VIIa and further advanced by the belt 8. Upon detection of the rear end of the original by the sensor S3 (15), there is initiated the counting of the notches 94 of the disk 93 shown in FIG. 2, and, upon arrival at a determined count, the motor M1 (82) is turned off while the clutch CL (85) is turned off and the brake BK (92) is turned on whereby the conveyor belt 8 is instantly stopped to set the original on the platen glass 12, with page 6 facing downwards. In this manner there is at first conducted a reversed feed step, in which an original on the original carrier tray is supplied, with inversion, onto the platen glass 12. Thereafter the feed finish signal is supplied to the copier B. In the copier B the original is exposed by the lamp 46 to copy the original image on a copy sheet in the same manner as explained before, but the copy sheet discharged from the fixing rollers 39, 39a passes a path IIIb and placed on the intermediate tray 40 as shown in FIG. 5 since the finger 48 is shifted anti-clockwise. After the exposure of the page 6, the original is subjected to a reversal step in which the original is guided through the paths IIIa, IVa, V2, VIa and VIIa in the same manner, in order to place the page 5 of the original downward onto the platen glass 12. Then the feed completion signal is again supplied to the copier B to conduct copying operation for the page 5 thus forming the image thereof on the rear side of the copy sheet already bearing the image of the page 6 and placed on the intermediate tray 40, and said sheet is discharged therefrom onto the tray 46 with said image of the page 5 upwards through the paths VIb, IIb and VIIIb. The original present on the platen glass 12 is subjected to a normal discharge step, in which the original is discharged from the platen glass 12 by the clockwise rotation of the belt 8 and guided through paths VIIa, VIa and is placed, with the page 5 upwards, on the originals stacked on the original carrier tray 1, by means of the conveyor rollers 11, 11a. At a certain time in the course of said normal discharge operation there is initiated the aforementioned reversed feed operation for a next original having pages 4 and 3 for placing said original, with the page 4 downwards, on the platen glass 12. Such simultaneous operations of normal discharge and reversed feed will hereinafter be called an reversed-feed and normal-discharge step. Thereafter the afore-mentioned copying cycle is repeated for a required number of times, so that the copy sheets are finally discharged on the tray 46 as shown in FIG. 4 while the originals are discharged and stacked on the original carrier tray 1 without any change in the initial order as shown in FIG. 3. In this manner obtained are two-side copies from two-side originals.

(iv) Case of Two-Side Copying From Two-Side Originals (With Sorter)

Figure 6:
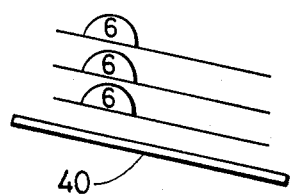
Figure 7:
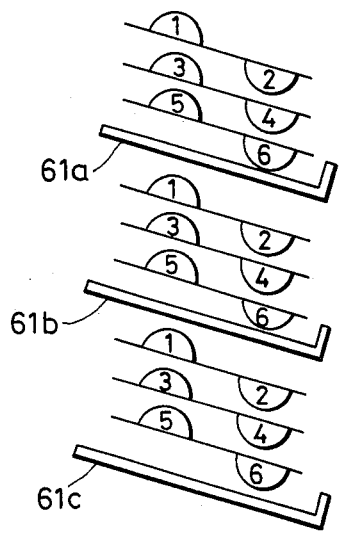

The operation in this case is substantially same as that in the aforementioned case of two-side copying from two-side originals without sorter. However, in contrast to the case without the sorter in which a reversed-feed and normal-dischage operation for each exposure of the original, the exposure of the original is repeated for the predetermined copy number when the sorter C is employed, whereby the copy sheets are temporarily stored on the intermediate tray 40 as shown in FIG. 6 and are then supplied again for forming the images on the rear sides and sorted in successive manner in the sorter C. Thus the copy sheets are finally stored in the sorter C as shown in FIG. 7 and the originals are discharged in the same manner as in the initial state as shown in FIG. 3. The entire copying operation is completed in this manner.

(v) Case of Two-Side Copying From One-Side Originals (Without Sorter)

It is assumed that the original carrier tray 1 supports n originals, with an uppermost original $O_1$ and a lowermost original $O_n$. The original setting is conducted in two ways, as shown in FIGS. 8-1 or 8-2, according to whether n is odd or even. At first there is explained a case where n is even. At first reference is made to FIG. 8-1, and an original $O_n$ is supplied onto the platen glass 12 with the normal feed operation. While a copy sheet bearing the image of said original $O_n$ is stored in the intermediate tray 40, a normal-feed and normaldischarge operation is conducted to replace the original $O_n$ with $O_{n-1}$. The original $O_{n-1}$ is not copied, and anormal-feed-normal-discharge operation is conducted to replace the original $O_{n-1}$ with an original $O_{n-2}$. Then a copying operation is conducted on said original $O_{n-2}$ to store the resulting copy sheet in the intermediate tray 40, and a normal-feed normal-discharge operation is conducted to set a succeeding original $O_{n-3}$ on the platen glass 12. If said original $O_{n-3}$ is an original of the first page, the sensor RS (19) detects the separating arm 22 to supply a cycle end signal from the two-side original circulating apparatus A to the copier B, which thus identifies that the number of the originals is four and even. The original $O_{n-3}$ is not copied and is replaced with a succeeding original $O_n$ in a normal-feed normal-discharge operation, whereby the original $O_n$ is set on the platen glass 12. At this point the originals and the copy sheets assume a state as shown in FIG. 9-1, (1) to (3).

Then the original $O_n$ is not copied and is replaced with the original $O_{n-1}$ in a normal-feed normal-discharge operation, whereby the original $O_{n-1}$ is placed on the platen glass 12 and the image thereof, i.e. page 3, is copied onto the rear side of a copy sheet already bearing the image of page 4, which is supplied from the bottom of the copy sheets stacked on the intermediate tray 40 and already having images on one sides thereof. The completed copy is discharged onto the tray 46. The above-described procedure is thereafter repeated, wherein the original $O_{n-2}$ is not copied and the original $O_{n-3}$ is copied onto the rear side of a copy sheet already bearing the page 2 and stored in the intermediate tray 40. In this manner a set of copy sheets bearing images on both sides thereof is discharged as shown in FIG. 10-1. The above-described procedure is repeated for the predetermined copy number. In case three sets are required for example, the obtained copy sheets are finally stacked as shown in FIG. 10-2 while the originals are stacked in the initial state as shown in FIG. 8-1 at the end of the entire copying operation.

Figure 11:
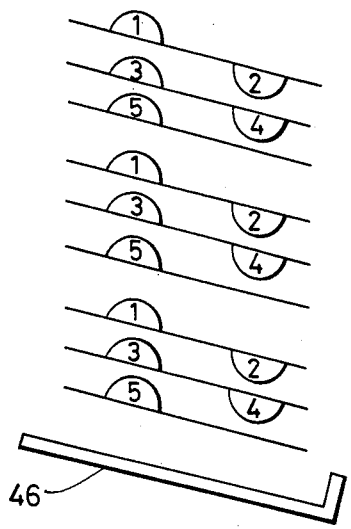

Now there will be explained a case wherein the number n of the originals is odd as shown in FIG. 8-2. In the same manner as in the foregoing case, there is repeated a procedure of copying an original $O_n$ to store the resulting copy in the intermediate tray 40, skipping a succeeding original $O_{n-1}$, then copying an original $O_{n-2}$ to store the resulting copy in the intermediate tray 40, skipping an original $O_{n-3}$ and copying an original $O_{n-4}$ to store the resulting copy in the intermediate tray 40, and, in the course of replacing the original $O_{n-3}$ with $O_{n-4}$, the copier B identifies, by the cycle end signal from the two-side original circulating apparatus A, that the number of originals is five and odd. Subsequently the original $O_{n-4}$ is replaced with the original $O_n$ whereby the original $O_n$ is set on the platen glass 12. At this point the originals and copy sheets assume a state as shown in FIG. 9-2, (1) to (3). Then the original $O_n$ is not copied and is replaced with the original $O_{n-1}$ by a normal-feed normal-discharge operation. Simultaneously with said replacement, the copy sheet already bearing the image of page 5, which has been stored in the intermediate tray 40, is circulated through paths VIb, IIb and IIIb and is placed on top of the copy sheets stacked on the intermediate tray 40. Then the original $O_{n-1}$ is copied onto the rear side of the copy sheet already bearing the image of page 3, which is then placed on top of the copy sheets on the intermediate tray 40 through the above-mentioned circulating paths. Simultaneously with said circulation the original $O_{n-1}$ is replaced with the original $O_{n-2}$, which is thus placed on the platen glass 12. The original $O_{n-2}$ is not copied, then the original $O_{n-3}$ is copied on the rear side of the copy sheet already bearing image of the page 1 and the obtained copy sheet is again stored in the intermediate tray 40. The original $O_{n-4}$ is not copied, and, at this point, the copy sheets assume a state as shown in FIG. 10-3. Thereafter the copy sheets on the intermediate tray 40 are in succession discharged from the bottom to the tray 46 through paths VIb, IIb and I0 VIIIb, thus providing a set of completed copies. The above-described procedure is repeated for the predetermined copy number. In case said number is equal to three, there will be finally obtained copy sheets as shown in FIG. 11 while the originals are stacked in the initial state as shown in FIG. 8-2 at the end of the entire copying operation.

(vi) Case of Two-Side Copying From One-Side Originals (With Sorter)

Figures 1, 12:
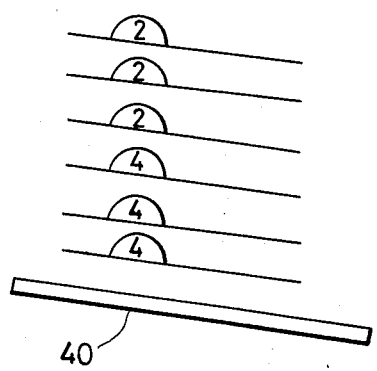
Figures 2, 12:
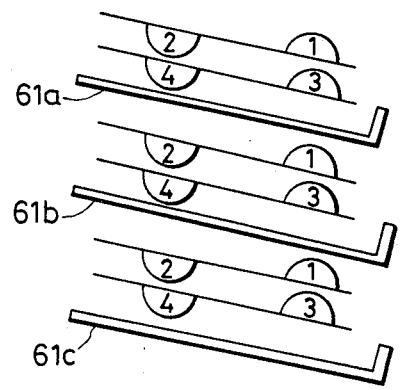
Figures 1, 13:
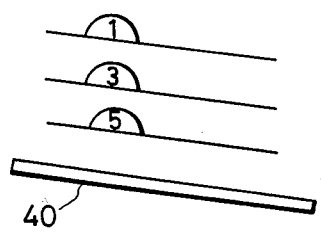
Figures 2, 13:
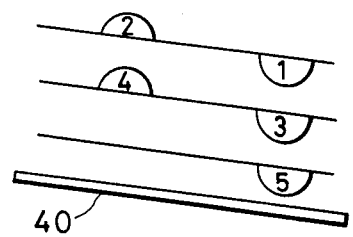
Figures 3, 13:
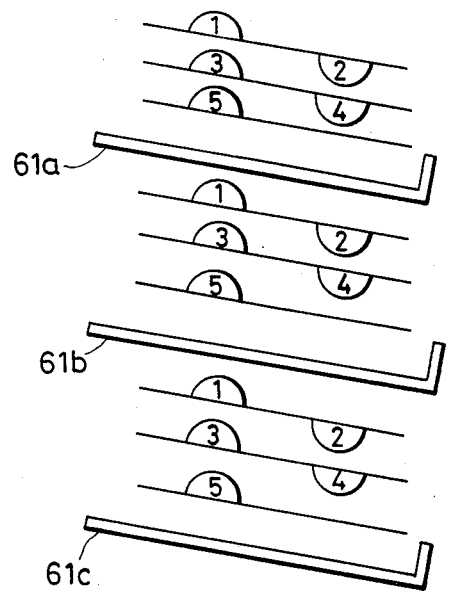

In contrast to the foregoing case (v) of two-side copying from one-side originals without sorter in which a normal-feed normal-discharge operation is conducted for each exposure of the original, the exposure in the present case with sorter is repeated for the predetermined copy nunber for each original. As an example, in case of making three copies from four originals as shown in FIG. 8-1, even pages are at first copied and the obtained copy sheets are temporarily stored on the intermediate tray 40 as shown in FIG. 12-1. Then said copy sheets are supplied again from the bottom to copy odd pages, so that the completed copies are stored in the sorter as shown in FIG. 12-2 at the end of the entire copying operation. Then, in case of making three copies from five originals as shown in FIG. 8-2, at first odd pages are copied and the obtained copy sheets are temporarily stored on the intermediate tray 40 as shown in FIG. 13-1. Then said copy sheets are supplied again from the bottom to copy even pages, then stored again in the intermediate tray 40 as shown in FIG. 13-2, and are guided into the sorter C without copying operation whereby the copies are finally stored in the sorter C as shown in FIG. 13-3 at the end of the entire copying operation.

Now there will be given an explanation on a control unit for executing the copying operations explained in the foregoing.

Figure 14:
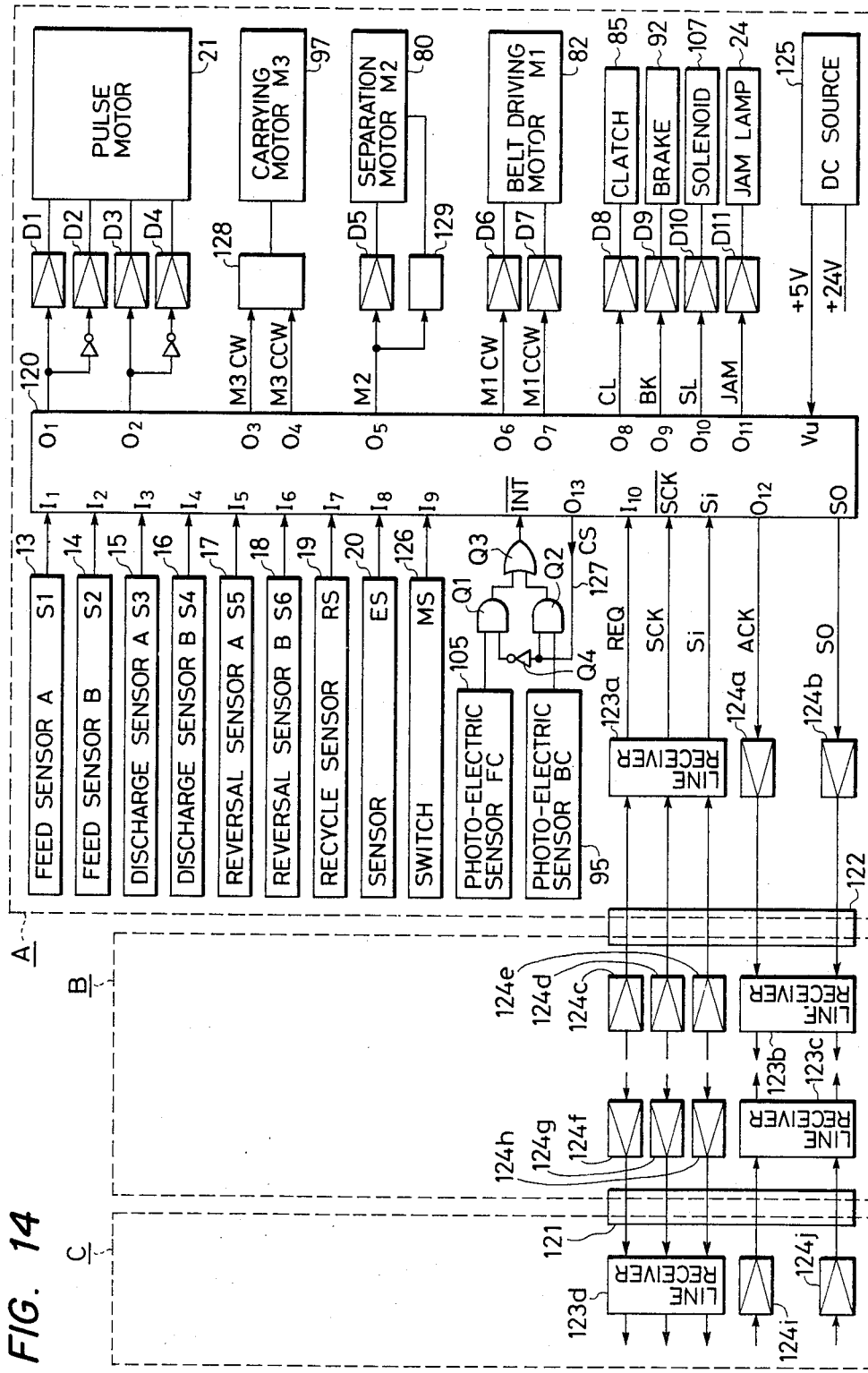
FIG. 14 is a block diagram showing a control circuit of the copier shown in FIG. 1.
Figure 15:
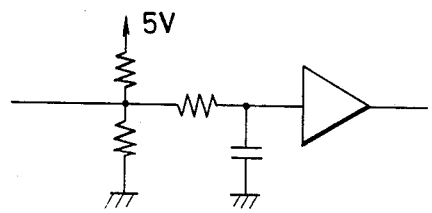
FIG. 15 is a circuit diagram of a line receiver.
Figure 16:
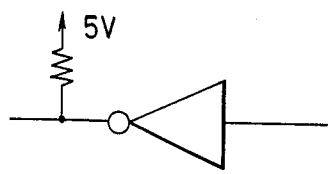
FIG. 16 is a circuit diagram of a line driver.

FIG. 14 is a block diagram of a control circuit for effecting the aforementioned operation sequence, wherein the two-side original feeding apparatus A, copier B and sorter C are respectively represented by broken lines, and the signal exchange therebetween is conducted in serial transfer process to be explained later, through a cable 122 between A and B, and a cable 121 between B and C. Line receivers 123a, 123b, 123c, 123d for receiving serial signals are composed of Schmidt TTL's of a circuit structure as shown in FIG. 15. Line drivers 124a, 124b, 124c, 124d, 124e, 124f, 124g, 124h, 124i, 124j for transmitting serial signals are composed of driver TTL's of a circuit structure as shown in FIG. 16. A one-chip microcomputer 120 of a known structure incorporating ROM, RAM etc., composed for example of μ-COM43N supplied by NEC, executes stored programs by a 5 V power supply obtained from a DC power supply of 125 V. Input ports $I_1$–$I_{10}$ of the microcomputer 120 receive signals from sensors, a signal from a microswitch MS (126) to be activated when the two-side original feeding apparatus A is opened at the front side, a request signal REQ from the copier B etc. An interruption port $\overline{\text{INT}}$ receives transport clock signals from the sensor 105 (FIG. 2) or belt clock signals from the sensor 95 (FIG. 2), through a circuit composed of AND gates Q1, Q2, an OR gate Q3 and an inverter Q4. Selection of said transport clock signals or said belt clock signals is made by a switching signal CS (127) supplied from an output port $O_{13}$. Output ports O1, O2, O5–O11 are connected to drivers D1–D11 for driving various loads. An output port $O_{12}$ releases an acknowledge signal ACK to be supplied to the copier B. Output ports O3, O4 respectively supply signals M3CW, M3CCM to a driver 128 including an electric brake, for controlling the rotation of the transport motor M3. An electric brake circuit 129 turns off the separating motor M2 and instantly applies electric brake thereto when a signal M2 from the output port O5 is turned off.

Now there will be explained the aforementioned serial process, while making reference to FIG. 17 (1) showing a timing chart of the serial transfer. Request signals REQ are constantly supplied, at a determined interval, from the copier B. In response to the entry of said signal REQ to an input port $I_{10}$ of the microcomputer 120, the acknowledge signal ACK is released from the output port $O_{12}$ of the microcomputer 120 of the circulating apparatus A, whereupon serial data Si from the copier B and serial data So from the feeding apparatus A are transferred at a rate of 8 bits per request, in synchronization with clock signals SCK supplied from the copier B to an input port $\overline{\text{SCK}}$ of the microcomputer 120. Detailed timings will not be explained as they are same as in the serial data transfer of μ-COM43N.

Field signal FLDL1 shown in FIG. 17(2) is 8-bit data supplied to the feeding apparatus A, wherein a bit 7 is used for designating the field and is always "0", a bit 6 represents an original feed signal for controlling the supply and replacement of originals in the copier B, a bit 5 is an orignal discharge signal for conducting the original discharge alone after the final exposure or in case of sheet jamming in the copier B, and bits 3-0 are instruction signals for conducting the aforementioned operations of normal-feed-normal discharge, reversed-feed-normal discharge, normal-feed-reversed-discharge, reversed-feed-reversed-discharge and inversion. For example, in the normal-feed-reversed-discharge operation, the bits 3-0 assume values "0, 0, 1, 0". Field signals FLD01, FLD02, FLD03 shown in FIG. 17 (3) are sets of 8-bit data, of 24 bits in total, wherein bits 7 and 6 are used for designating the field. In FLD01, a bit 5 is the original feed finish signal which is turned on when the original is set on the platen glass 12 (FIG. 1), a bit 4 is an operating signal which is turned on upon reception of the original feed signal from the copier B, and a bit 3 is a driving signal which is turned on in the course of the original transport sequence of the feeding apparatus A, particularly when heavy duty loads such as motors are turned on, in order to limit the maximum power consumption of the entire system including the copier B, for example by turning off a halogen lamp in the fixing unit 39 of the copier B while said signal is turned on. Bits 2-0 are original size signals detected by the sensors 13, 14 in the course of transport of the original from the original carrier tray 1 to the platen glass 12, assuming values "0, 0, 1" for example for the A4 size, and are transmitted to the copier B substantially simultaneous with the original feed finish signal. In response to said original size signals, the copier B selects the copy sheet. In FLD02, a bit 5 is the cycle end signal which is turned on when the cycle end sensor RS (19) detects the separating arm 22 (FIG. 1) rotated by the weight thereof after the last one of the originals is fed. A bit 4 indicates the state of the original detection signal which is turned on when the original is placed on the original carrier tray 1 (FIG. 1). Bits 3-0 of FLD02 and FLD03 are original number signals indicating the number of detected originals, simultaneously with the detection of end of the cycle of the originals, wherein said number is represented by a binary number of which upper digits and lower digits are respectively represented by FLD02 and FLD03, so that for example 20 originals are represented by "0, 0, 0, 1" and "0, 1, 0, 0" of the bits 3-0 of FLD02 and FLD03. In FLD03, a bit 5 is a jam signal in case of a defective transportation of the original in the feeding apparatus A, and a bit 4 is an open-door signal which is activated when the microswitch MS 126 (FIG. 15) is actuated by the opening of the door of the feeding apparatus A. This signal is used for an original for which the feeding apparatus A is not usable, for example a bound original, and, in the presence of said signal, the copying operation of the copier B is started without the supply of the original feed signal to the feeding apparatus A when the copy button of the copier B is actuated.

Figure 18:
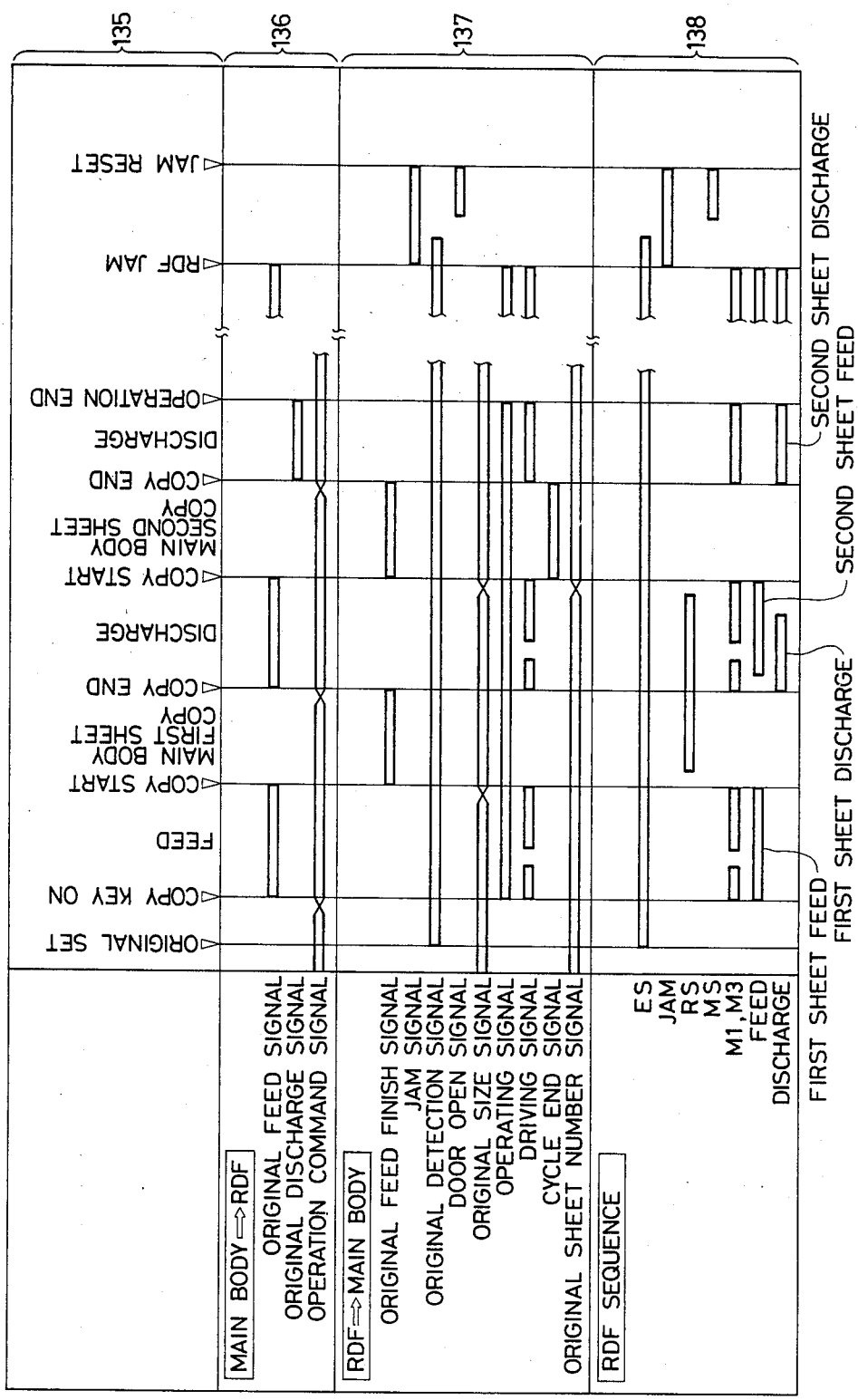
FIG. 18 is a timing chart of various signals controlling the function of the two-side original feeding apparatus and the copier.

FIG. 18 is a timing chart showing various signals of the serial data corresponding to various functions (135) of the two-side original feeding apparatus A and the copier B. 136 indicates serial signals transmitted from the copier B to the feeding apparatus A, while 137 indicates serial signals transmitted from the feeding apparatus A to the copier B, and 138 indicates the sequence in said apparatus A. The represented example shows a case of making a copy from each of two originals, in which a jamming occurs at the discharge of the second original.

Now reference is made to control flow charts shown in FIGS. 19 to 30 and timing charts shown in FIGS. 31 to 40 for explaining the function of the feeding apparatus.

Figure 19:
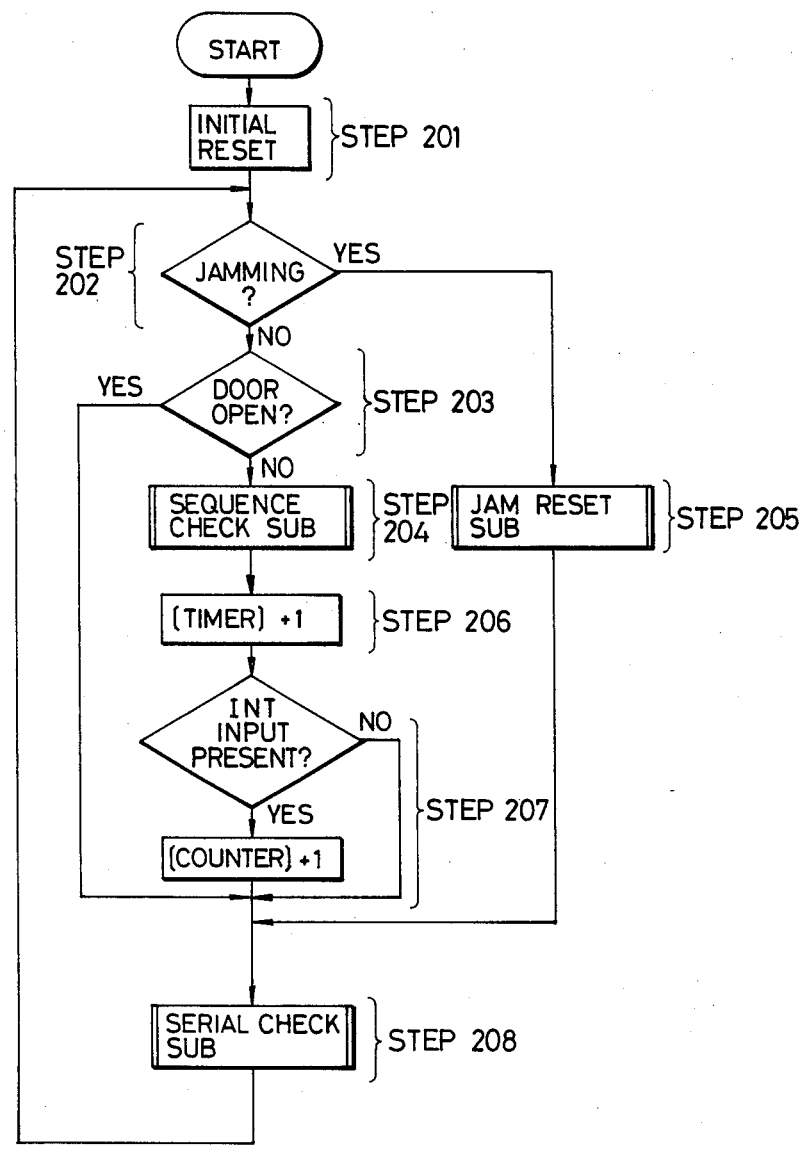
FIGS. 19 to 30 are control flow charts of the two-side original feeding apparatus.

FIG. 19 shows a main flow chart of the operation sequence of the feeding apparatus, wherein a step 201 executes an initial resetting, when the power supply is turned on, by turning off output ports, clearing the RAM area in the microcomputer 120 and also clearing counters, timers, commands etc. to be explained later. A step 202 discriminates the presence of a jam state, and, if present, the program proceeds to a JAM RESET subroutine in a step 205 to await the resetting of the jam state, or, if absent, the program proceeds to a succeeding step 203. Said step 203 discriminates whether the door of the apparatus A is open, and, if open, the program proceeds to a step 208, but, if closed, the program proceeds to a succeeding step 204 for entering a SEQUENCE CHECK subroutine to be explained later. A next step 206 executes stepwise increment of each of the timers activated in the step 204, and a step 207 discriminates the presence of an input signal to the port INT receiving the transport clock signals and belt clock signals, and, if present, effects the stepwise increment of each of said timers activated in the step 204. A step 208 starts a SERIAL CHECK subroutine for effecting the aforementioned serial signal transfer with the copier B. If the function is normal, the program returns, after the steps 202, 203, 204, 206, 207 and 208, to the step 202, while each of the subroutines is called by a command CAL of the microcomputer and is terminated by a command RET thereof.

Figure 20:
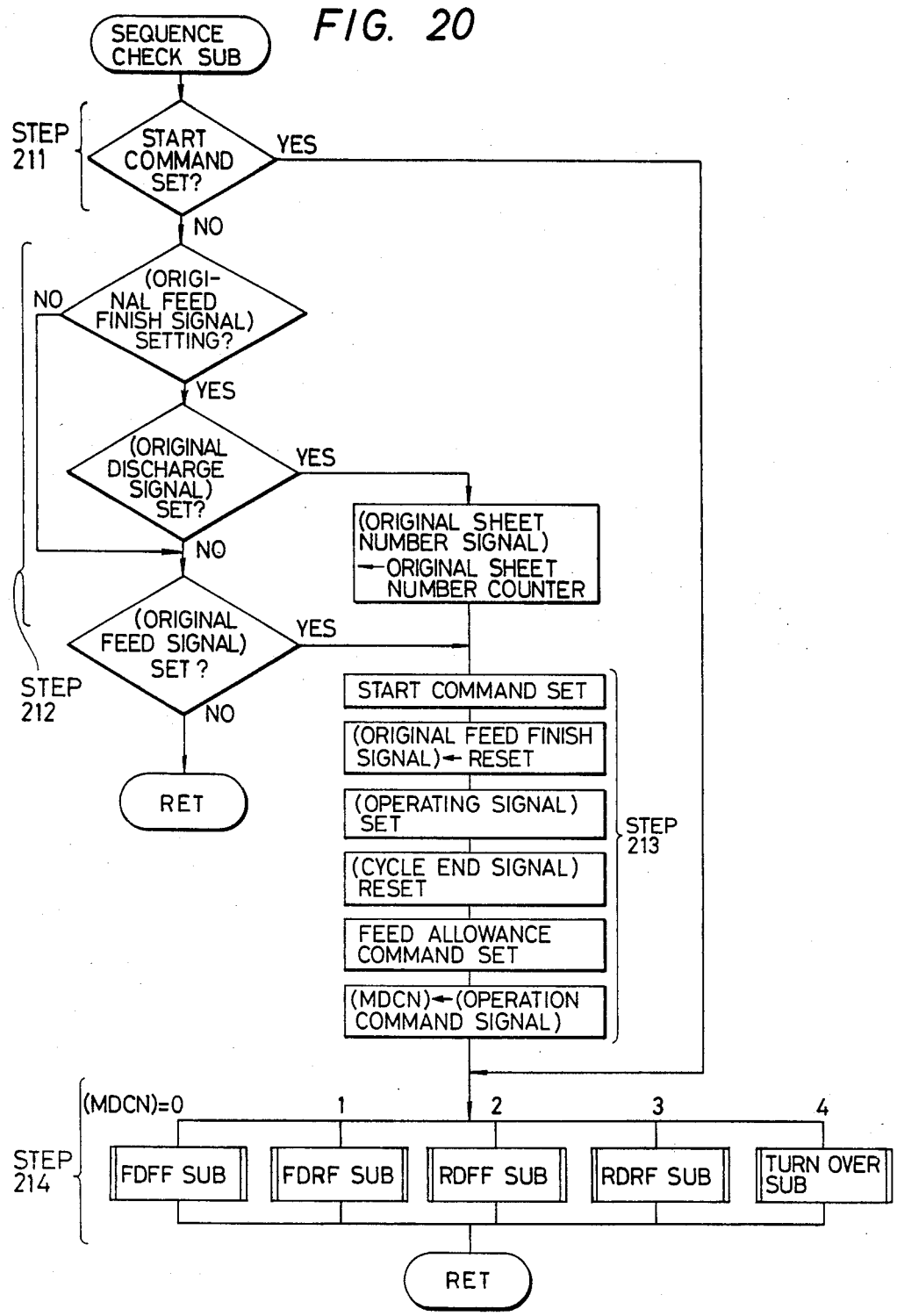

FIG. 20 shows the details of the SEQUENCE CHECK subroutine in the aforementioned step 204, in which a step 211 discriminates whether a start command, to be explained later, is set, and, if set, the sequence operation is identified in progress and the program proceeds to a step 214. If said command is not set, the program proceeds to a step 212 for awaiting an operation start command from the copier B. In said step 212, the program proceeds to a step 213 only if either of the original feed signal and the original discharge signal is set. However the original discharge signal is accepted only when the original feed finish signal is set, i.e. when an original has been fed to the platen glass 12 of the copier and a copying operation is already in progress, and, in such case, the content of an original number counter is set in the original number signal to be explained later. If neither of said signals is set, the program proceeds to a step RET whereby the SEQUENCE CHECK subroutine enters a standby state. The step 213 designates the mode of sequence operation and activates said operation. At first the start command is set in order to enable the discrimination of the operation mode only at the start of operation, thereby prohibiting the change of the operation mode from the start of operation to the end of the copying operation in the copier B, and causing the step 211 to disregard the step 213 when the operation is in progress. Also the step 213 resets the original feed finish signal at the end of the copying operation in the copier B, sets the operating signal indicating the start of the operation, and resets the cycle end signal which is released at the end of a cycle of the originals. It also sets a sheet feed enable signal to be explained later, thereby instructing the start of the sheet feeding operation, and stores an operation command signal, for designating the operation mode by the copier B in a table counter MDCN. A next step 214 is branched according to the content of said table counter MDCN. Thus the program proceeds to a normal-feed-normal-discharge subroutine for the normal-feed-normal-discharge mode in case of (MDCN)=0, to an reversed-feed-normal-discharge subroutine in case of (MDCN)=1, to normal-feed-reversed-discharge subroutine in case of (MDCN)=2, to an reversed-feed-reversed-discharge subroutine in case of (MDCN)=3, or to an reversal subroutine in case of (MDCN)=4. The operation mode is designated in the step 213 at the start of operation, then the content of the table counter MDCN is determined according to said operation mode, and the subroutine is selected in the step 214 according to the content of said table counter 214. It is therefore rendered possible to change the operation mode at the start of operation by the operation command signal of the copier, for example to supply the first original in the normal feed mode and to select the reversed-feed-reversed-discharge mode for the next operation, thus discharging the first original in the reversed discharge mode and supplying the second original in the reversed feed mode.

Figure 21A:
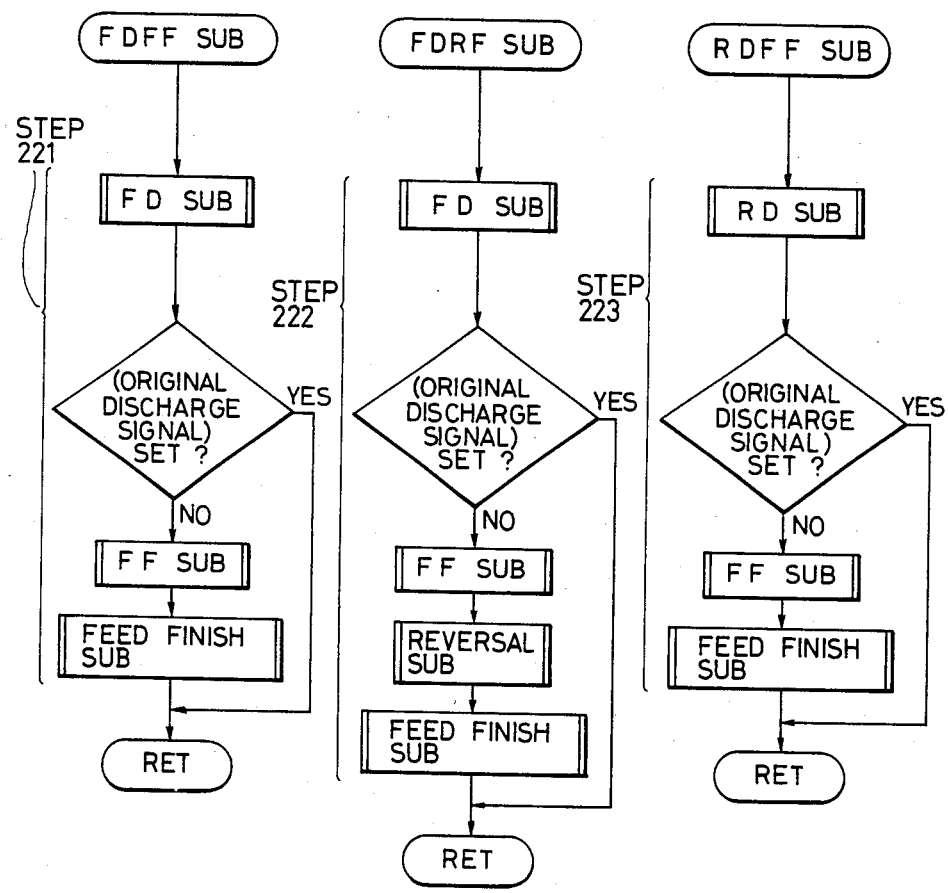
Figure 21B:
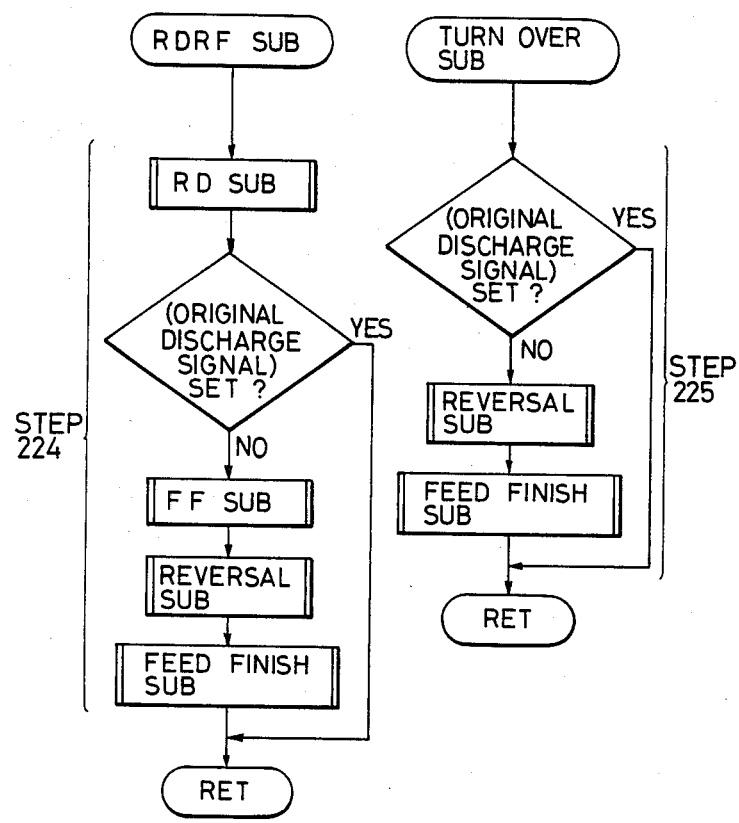

FIG. 21 shows the subroutines for feed-discharge operations according to the operation command determined in FIG. 20. A step 221, representing the normal-feed-normal-discharge subroutine, comprises a normal discharge subroutine, a normal feed subroutine and a feed finish subroutine for parallel execution of the discharge, feed and feed finish procedures. Similarly a step 222 effects the reversed-feed-normal-discharge operation, a step 223 effects the normal-feed-reversed-discharge operation, a step 224 effects the reversed-feed-reversed-discharge operation, and a step 225 effects a reversing operation. Each of said steps 221-224 identifies whether the original discharge signals is set, and, if set, effects the discharge operation only. On the other hand, in the step 225 said discharge operation is prohibited. Each of the steps 221-224 effects the discharge operation at first, but said operation is not conducted if the original is not present on the platen glass 12 of the copier.

Figure 22A:
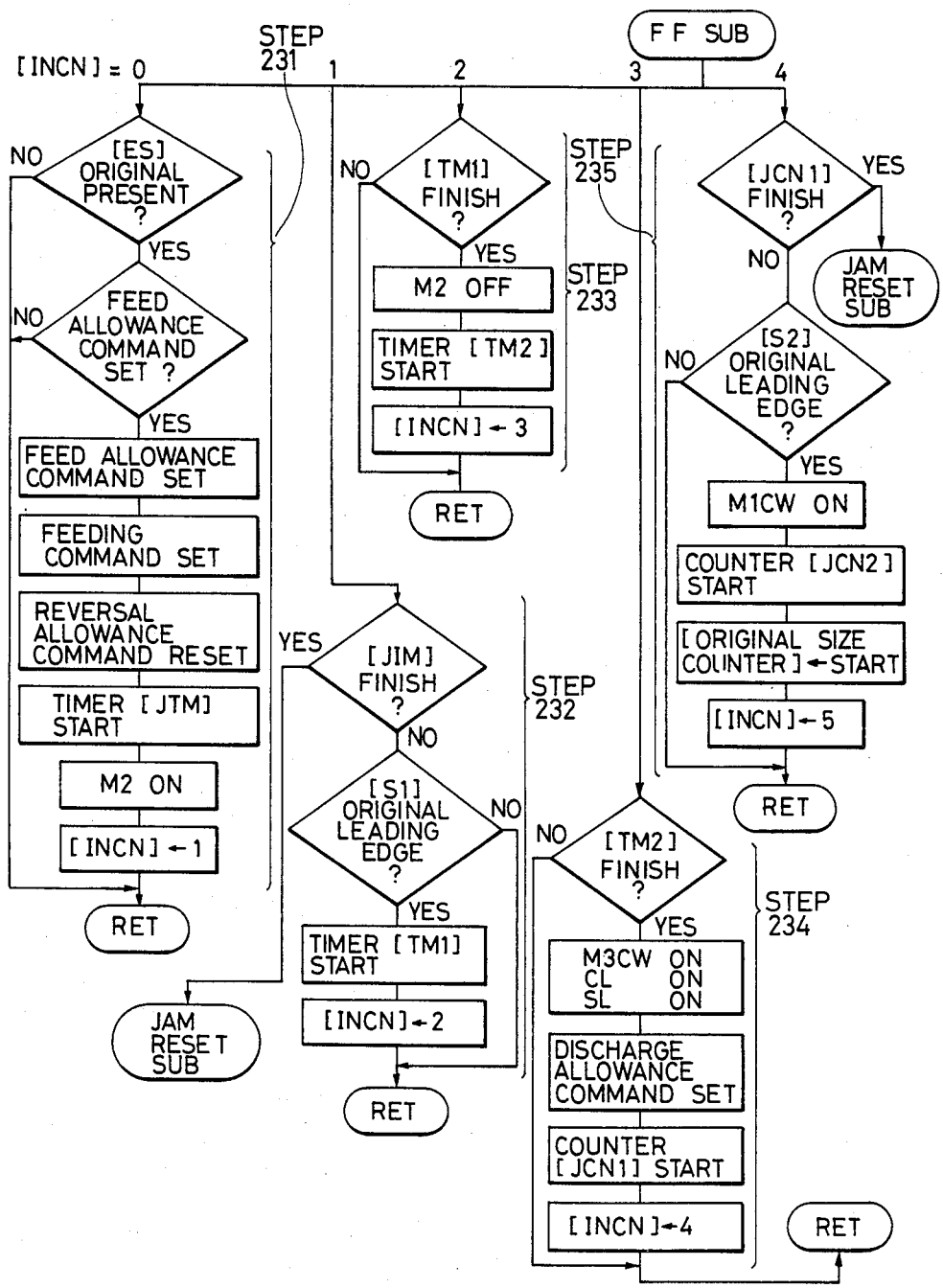
Figure 22B:
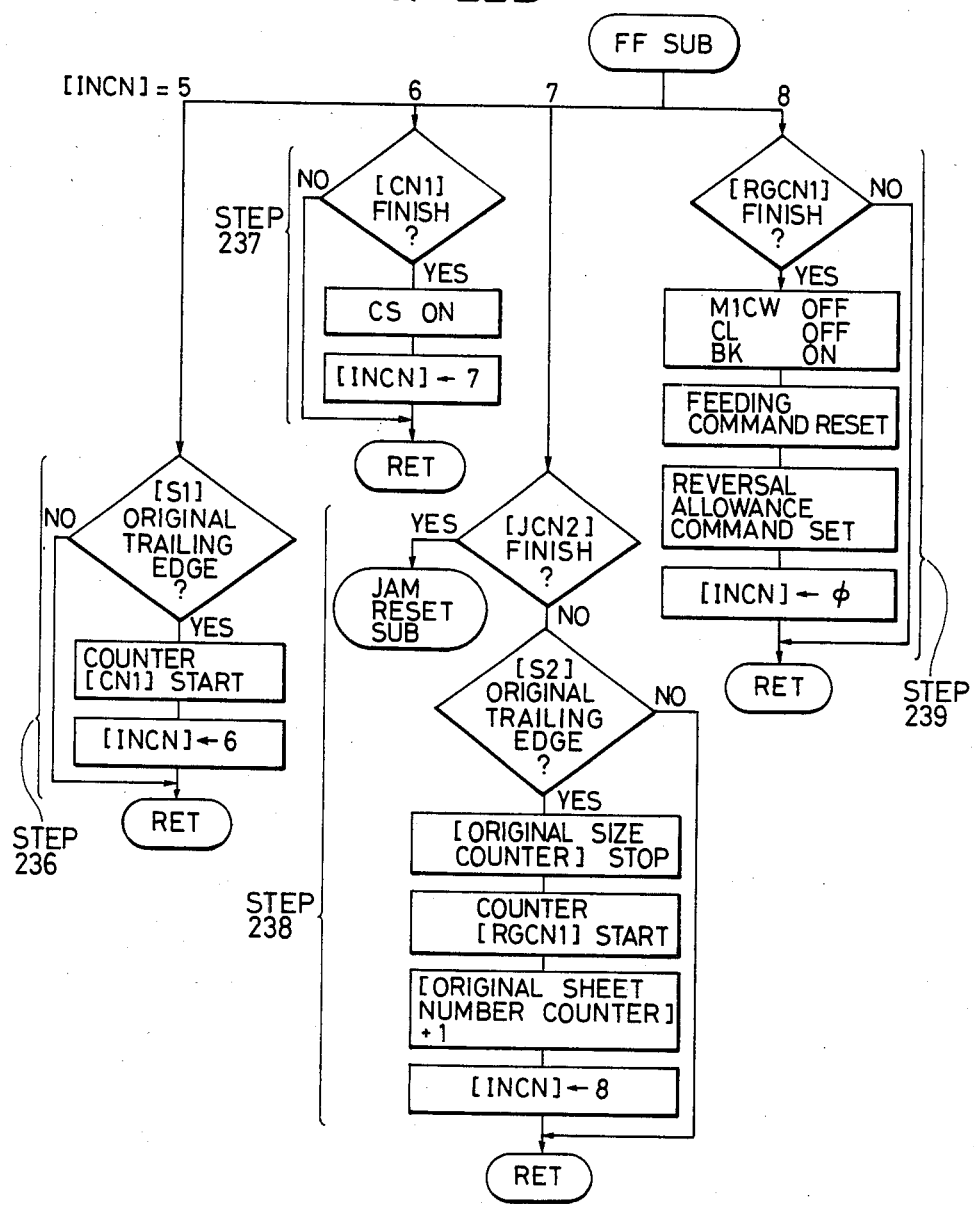
Figure 25A:
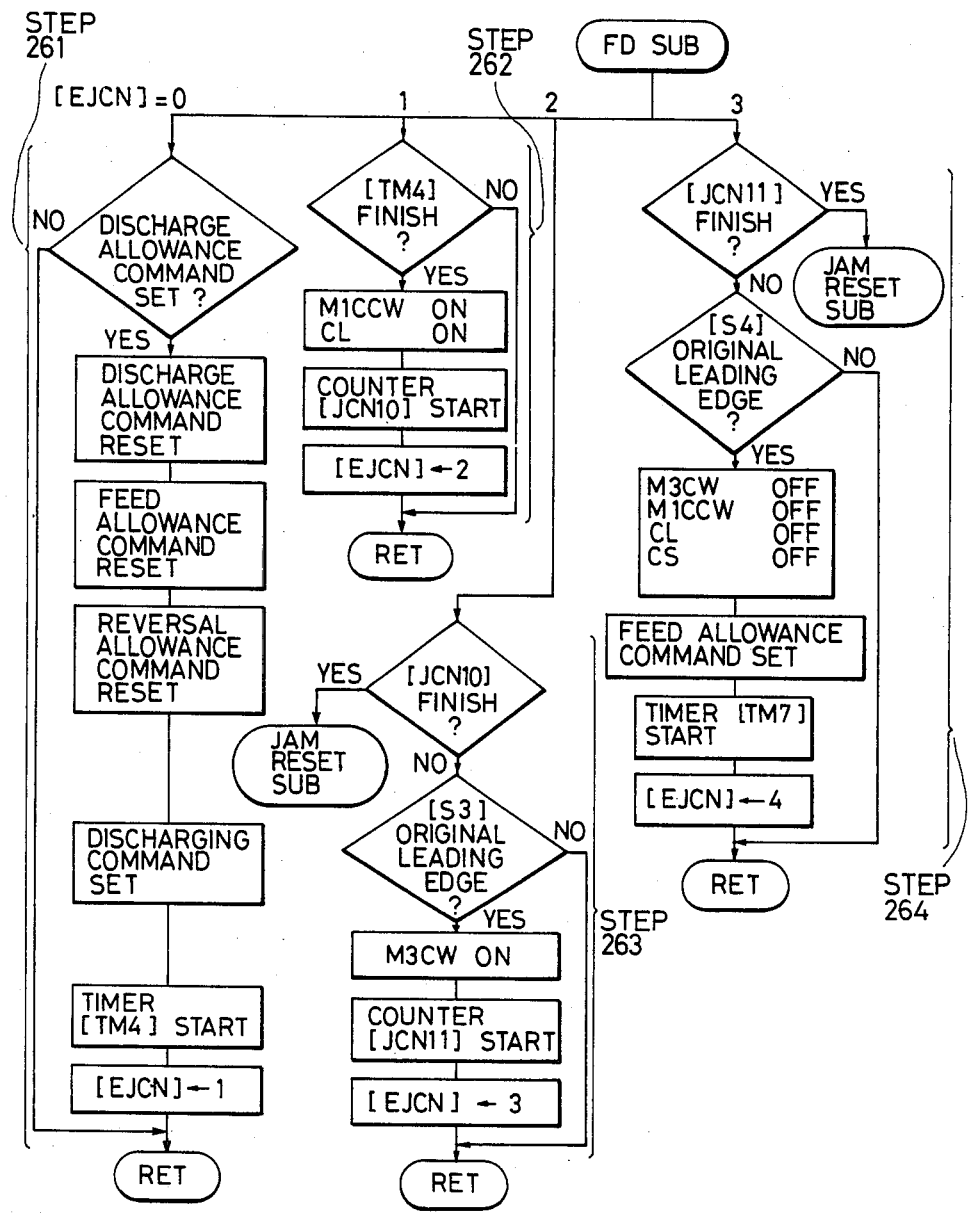
Figure 25B:
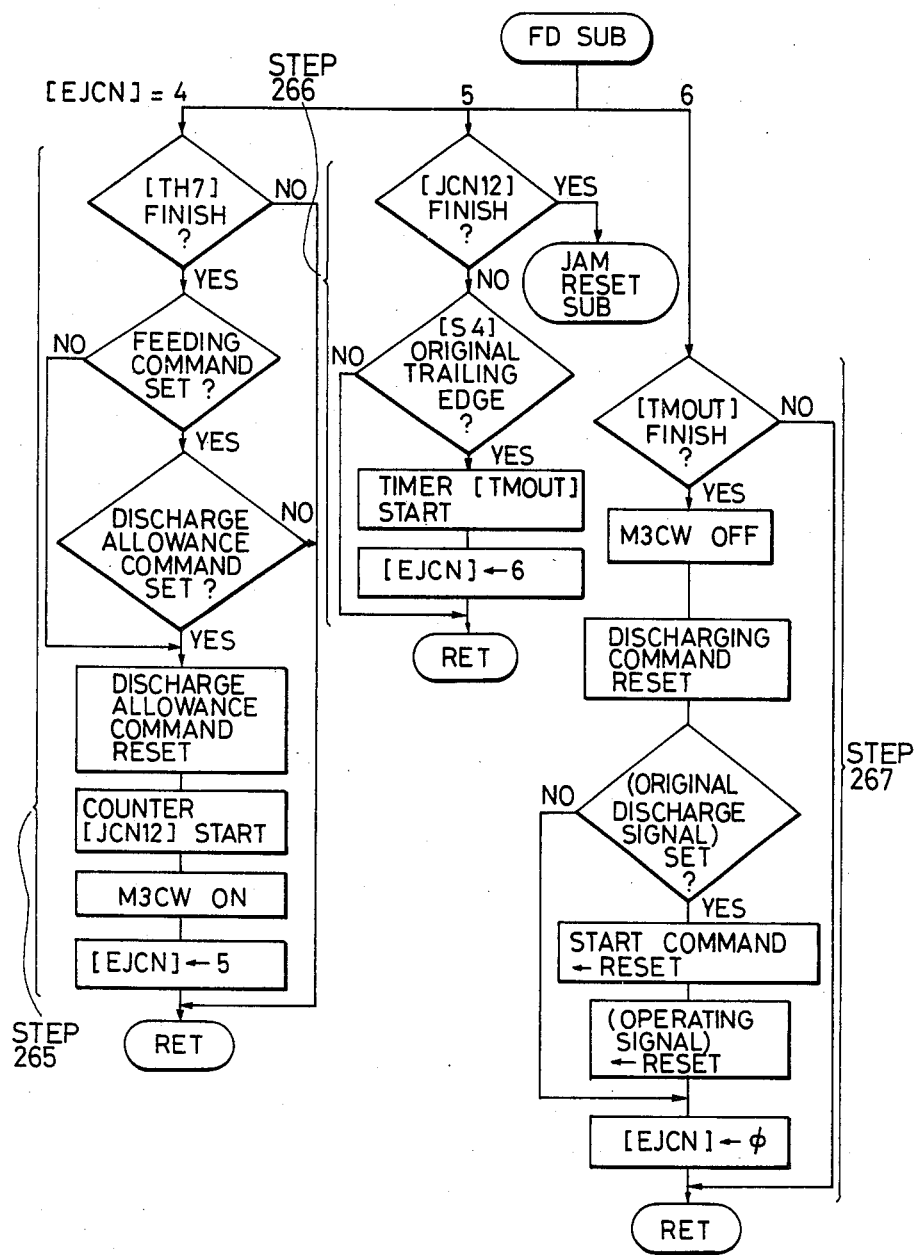

Now there will be given a detailed explanation on the normal-feed-normal-discharge operation, making reference to flow charts of a normal-feed subroutine, a normal-discharge subroutine and a feed completion subroutine respectively shown in FIGS. 22, 25 and 27 and taking a case of employing two originals for example.

The normal-feed-normal discharge operation is commenced by placing two originals on the original carrier tray 1, selecting said mode by the copier B and setting the original feed signal. In the normal-feed subroutine shown in FIG. 22, a step 231 identifies the detection of the original by the sensor ES (20) in FIG. 1-1, resets the feed enable signal which has been set in the aforementioned step 213, resets the reversal enable command, sets the feeding signal to prohibit other operations, starts a jam timer JTM for measuring the time to the sensor S1 (13) in FIG. 1-1, turns on the separating motor M2 (80) in FIG. 1-1, and sets "1" in a tatle counter iNCN for initiating the separation of the original. The program is branched according to the content of said table counter iNCN, wherein said content is renewed with the progress of the operation sequence. Other table counters to be explained later perform similar functions. A step 232 discriminates whether the leading end of the separated original is detected by the sensor S1 before the expiration of said jam timer JTM, and, if said timer expires before said detection, a defective separation is identified and the program proceeds to the JAM RESET subroutine. If the function is normal, a timer TM1 is started for guiding the leading end of the original proceeding in the path Ia to the rollers 6, 6a and forming a loop in said original, and the table counter iNCN is stepped up to "2". A step 233 turns off the motor M2 upon expiration of said timer TM1 to form said loop, starts a loop stabilizing timer TM2 and steps up the table counter iNCN to "3". A step 234 turns on signals M3CW, M1CW, CL, SL released from the output ports O3, O6, O8, O10 of the microcomputer 120 upon expiration of said loop stabilizing timer TM2 thereby initiating the transportation of the original, sets the discharge enable signal to be explained later, starts a jam counter JCN1 for measuring the time to the sensor S2 (14) shown in FIG. 1-1, and steps up the table counter iNCN to "4". A step 235 identifies whether the leading end of the original is detected by the sensor S2 before the expiration of the jam counter JCN1, and, if said counter expires without said detection, a delay jamming is identified and the program enters the JAM RESET subroutine. If the operation is normal, a jam counter JCN2 is started upon said detection, in order to detect a stay jamming by measuring the time required by the original to pass through the sensor S2, then an original size counter is started to initiate the original size detection, and the table counter iNCN is stepped up to "5". A step 236 discriminates whether the sensor S1 detects the trailing end of the original, and, upon detection, starts a counter CN1 for counting the clock signals of a number corresponding to the distance from the sensor 1 to the rollers 6, 6a, and steps up the table counter iNCN to "6". A step 237 turns on a signal CS released from the output port O13 upon expiration of said counter CN1, and steps up the table counter iNCN to "7". While the original is supported by the rollers 6, 6a and the belt 8, the transport speed of the original is equal to that of the rollers 6, 6a so that the counters depend on the clock pulses released from the disk 104 and the photosensor 105. However, as soon as the trailing end of the original leaves the rollers 6, 6a, the transport speed of the original becomes equal to that of the belt 8, whereby the control depends on the belt clock signals released from the disk 94 and the photosensor 95. Consequently, upon expiration of said counter CN1 when the trailing end of the original leaves the rollers 6, 6a, a signal CS for controlling the input signal to the interruption port INT is turned on to replace the transport clock signals with the belt clock signals, thereby achieving continuity in the control without any change in the relationship between the clock signals and the distance of transportation. A step 238 discriminates whether the trailing end of the original is detected by the sensor S2 1 before the expiration of the jam counter JCN2, and, if said counter expires before said detection, a stay jamming is identified and the program proceeds to the JAM RESET subroutine. On the other hand, if the operation is in the normal state, the original size counter is turned off at the detection of the trailing end to terminate the original size detection, then a registration counter RGCN1 is started for measuring the time required for the original to move to the determined position IIa on the platen glass 12 of the copier B, the original number counter is stepped up to count the number of originals, and the table counter iNCN is stepped up to "8". A step 239 turns off the signals M3CW, M1CW, CL and turns on a signal BK upon expiration of said registration counter RGCN1 in order to precisely stop the original at said position IIa on the platen glass 12, also resets the feeding command, sets the reversal enable command to be explained later, and resets the table counter iNCN to "0". Thereafter the program returns to the step 231 and enters a standby state since the feed enable command has been reset in this state.

Figure 27A:
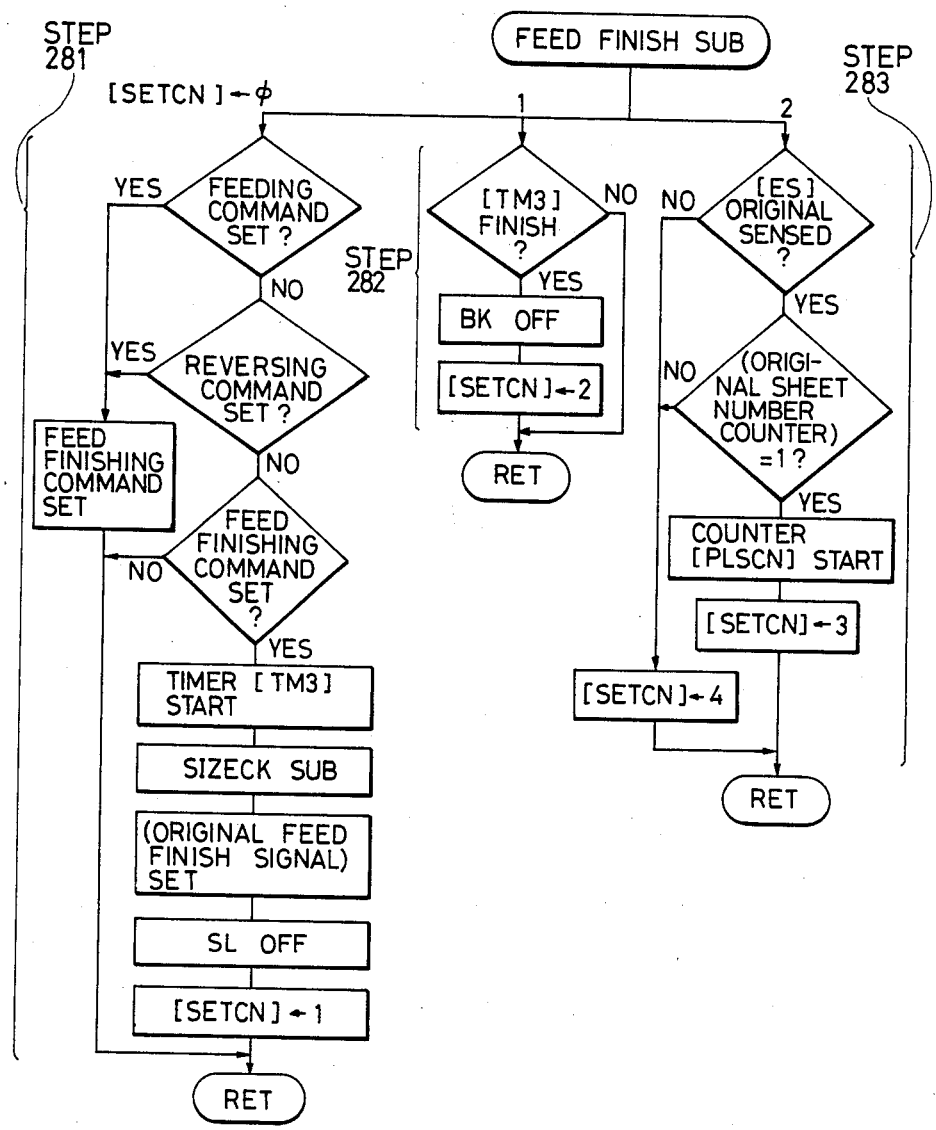
Figure 27B:
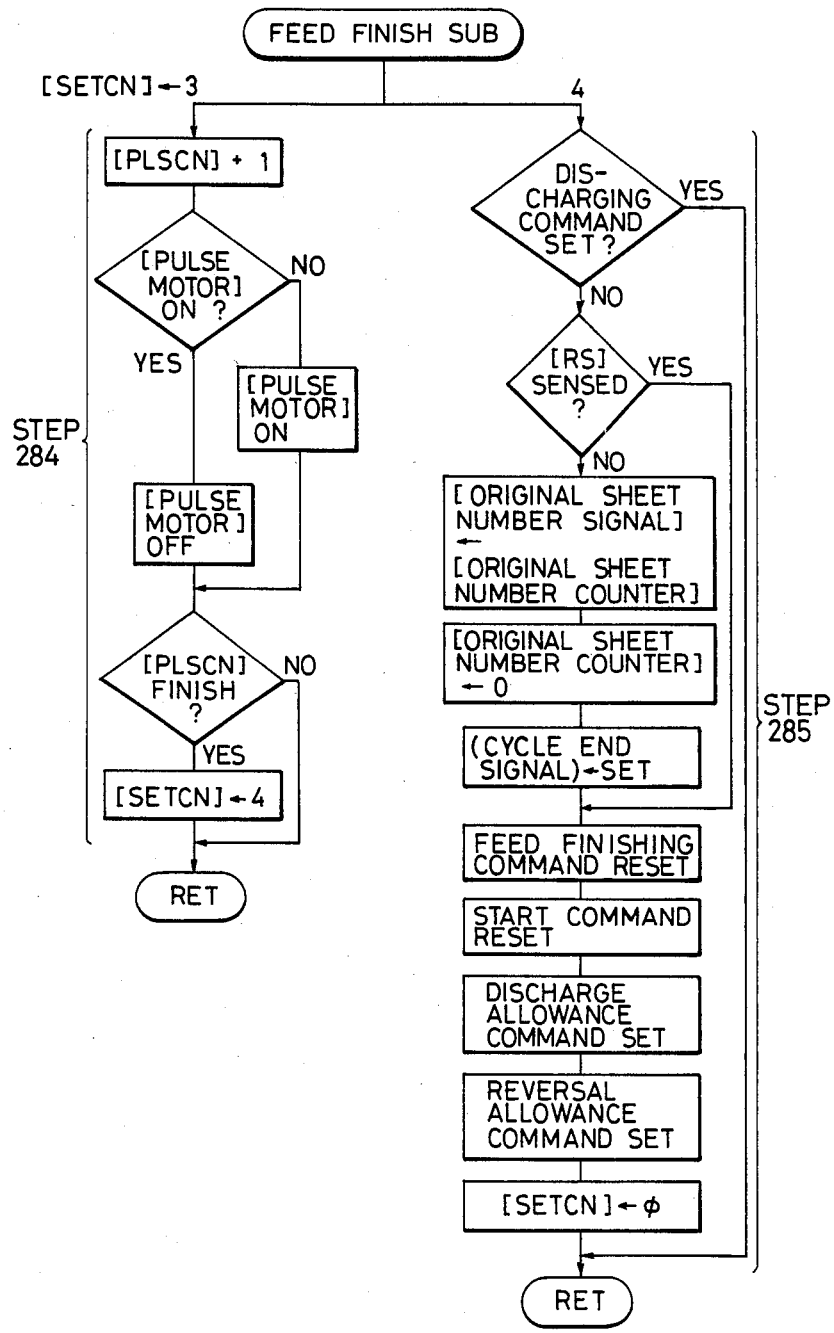

Now reference is made to FIG. 27 showing the feed finish subroutine. At first a step 281 is executed in a state that a table counter SETCN=0. During the aforementioned normal-feed operation, the feeding command has been set so that the standby state is established by setting the feed finishing command. Said standby state is resolved by the resetting of the feeding command in the aforementioned step 239, as the reversing command to be explained later is also reset. Thus, as the feed finishing command is also set, a timer TM3 for measuring the energizing time of the brake BK (92) is started, and a SIZECK subroutine is executed for identifying the original size from the content of the original size counter and storing the original size data in the original size signal in the serial data. Subsequently the original feed finishing signal is stored in the serial data and a copy start command is released to the copier. In response the copier turns off the original feed signal and initiates the first copying operation. Then the solenoid SL is deactivated to switch the path for the original, and the table counter SETCN is stepped up to "1". A step 282 turns off the brake BK upon expiration of said timer TM3, and steps up the table counter SETCN to "2".

Steps 283, 284 controls the separating arm 22 for detecting a cycle of the stacked originals and the stepping motor 21. The step 283 discriminates the output signal from the sensor ES indicating the presence or absence of a next original on the original carrier tray 1. In case the next original is absent, the stepping motor 21 need not be operated since there is only one original. Thus the table counter SETCN is stepped up to "4" and the program proceeds to a step 285. On the other hand, if the next original is present, there is identified whether the content of the original number counter is equal to "1". If not "1", there should exist two or more originals so that the control with the stepping motor 21 should have been conducted, and the program proceeds likewise to the step 285. In the present example in which the content of said counter is equal to "1", indicating the first original, there is started a counter PLSCN for causing one turn of the stepping motor 21, and the table counter SETCN is stepped up to "3". The succeeding step 284 steps up the counter PLSCN for each routine process to turn on or off the stepping motor 21 respectively when it is off or on, thus advancing the stepping motor 21 by a step angle and causing a full turn thereof at the expiration of the counter PLSCN, and thereafter steps up the table counter SETCN to "4". The step 285 checks the discharging command to await the completion of the discharging operation in progress, and proceeds to a next step when said command is reset, indicating the completion of the discharging operation. Since the first original is handled in the present case, there is identified whether the recycle sensor RS (19) still continues the detection. As said sensor still detects the separating arm 22 placed on the remaining originals, there is identified that the first cycle of the originals is still in continuation. However, in the absence of said detection, indicating the completion of a cycle of the originals, the content of the original number counter is stored as the number of the originals of a set in the original number signal of the serial data, then said content is cleared, and the cycle end signal is simultaneously set to transmit the completion of a cycle to the copier. Furthermore the step 285 resets the feed finishing command and the aforementioned start command, sets the feed enable command and the reversal enable command and resets the table counter SETCN to "0", whereupon the program enters the standby state.

At this point the program proceeds to the step 212 shown in FIG. 20 by resetting the start command, and, if a copying operation is in progress in the copier, the program returns to RET and enters the standby state as the original discharge signal and the original feed signal are both reset in this state.

Now there will be explained the normal-feed-normal-discharge operation after the end of a copying operation. Referring to FIG. 20, if the original feed signal is set at the end of the copying operation, the program proceeds to steps 213, 214 to reset the original feed finish signal and call the normal-feed-normal-discharge subroutine. In the normal-feed-normal-discharge subroutine shown in FIG. 21, there are executed a normal-discharge subroutine shown in FIG. 25 and a normal-feed subroutine shown in FIG. 22 in parallel, in order to effect the normal feed of the second original simultaneously with the normal discharge of the first original. Now reference is made to FIG. 25 for explaining the normal discharge operation for the first original. As a table counter EJCN is "0" in this state, the program proceeds to a step 261 for inspecting whether the discharge enable command is set. As said command is set in the step 234 of the normal-feed subroutine in this case, the program proceeds further to reset the discharge enable command, feed enable command and inversion enable command thereby prohibiting other operations, to set the discharging command, to start an interval timer TM4 and to step up the table counter EJCN to "1". A next step 262 turns on the signals M1CCW, CL upon expiration of said interval timer TM4 thereby initiating the original discharging operation, starts a jam counter JCN10 for measuring the time to the discharge sensor S3 (15), and steps up the table counter EJCN to "2". A next step 263 discriminates whether the discharge sensor S3 detects the leading end of the original proceeding in the path VIIa before the expiration of the jam counter JCN10, and, if said counter expires without said detection, a delay jamming is identified and the program proceeds to the JAM RESET subroutine. On the other hand, if the operation is normal, a jam counter JCN11 for measuring the time to the discharge sensor S4 (16) is started and the table counter EJCN is stepped up to "3". A next step 264 discriminates whether the discharge sensor detects the leading end of the original before the expiration of the jam counter JCN11, and, if said counter expires without said detection, a delay jamming is identified and the program proceeds to the JAM RESET subroutine. On the other hand, if the operation is normal, the signals M3CW, M1CCW, CL and CS are turned off suspend the transportation, thereby stopping the original at a position bridging the rollers 6, 6a and the belt 8. Simultaneously the feed enable command is set to initiate the normal-feed operation for the second original, then the standby state in the step 231 of the normal-feed subroutine shown in FIG. 22 is resolved, and the feeding command is set to initiate the separation of the second original in the aforementioned manner. Furthermore an interval timer TM7 is started, and the table counter EJCN is stepped up to "4". In a next step 265, the program enters a standby state until the feeding command and the discharge enable command are set upon expiration of the interval timer TM7. Said discharge enable command is set, in the course of the normal-feed operation for the second original in FIG. 22, at the step 234 when the transport of the second original is started. Thus the procedure in the step 265 proceeds further to reset the discharge enable command, to start a jam counter JCN12 for measuring the time until the original passes through the sensor S4, to turn on the signal M3CW thereby initiating the discharge operation and to step up the table counter EJCN to "5". A next step 266 discriminates whether the sensor S4 detects the trailing end of the original before the expiration of the counter JCN12, and, if said counter expires without said detection, a stay jamming is identified and the program enters the JAM RESET subroutine. On the other hand, if the operation is normal, after the discharge operation through the path VIa, a post-rotation timer TMOUT is started, and the table counter EJCN is stepped up to "6". A step 267 turns off the signal M3CW and resets the discharging command upon expiration of said post-rotation timer TMOUT, thus terminating the discharge operation. In addition, if the original discharge signal is set, indicating that said discharge operation is instructed by the copier, the start command shown in FIG. 20 is reset and the serial data are reset to terminate all the operations, and the table counter RJCN is reset to zero. Then the program returns to the step 261 and enters a standby state. In case the second original is being fed, the feed finishing subroutine shown in FIG. 27 is in progress simultaneously with the discharge operation for the first original, so that the original feed finish signal is set and the copier is copying the second original. As a cycle of the originals in this case is completed by the feeding of the second original, the detection of the sensor RS is terminated in a step 285, whereby the cycle end signal is supplied to the copier to turn off the start command. Thus the program enters a standby state in the step 212 in FIG. 20.

Now there will be explained the normal discharge operation for the second original. Since the cycle end signal is released in this case, the original discharge signal is set after the completion of the second copying operation, in order that the copier effects the discharge operation alone. Therefore, in the normal-feed-normal-discharge subroutine shown in FIG. 21, the step 221 executes the normal-discharge subroutine but does not execute the normal-feed subroutine. The normal discharge operation is conducted according to the steps 261 to 267 as shown in FIG. 25, and, as the original discharge signal is set as explained before, a step 267 terminates the operation, and resets the start command and operating signal. In response the copier turns off the original discharge signal, thus completing the copying operation for a cycle of the originals.

Now there will be explained the reversed-feed-normal-discharge operation. The operation is conducted by the reversed-feed-normal-discharge subroutine of the step 222 shown in FIG. 21, wherein the original present on the platen glass 12 of the copier is discharged through the path VIIa according to the normal discharge subroutine shown in FIG. 25. Said operation is suspended at a step 264 when the leading end of the original reaches the sensor S4 and the reversed feed of the succeeding original is initiated, through the path Ia according to the normal feed subroutine shown in FIG. 22. After the original separation, the normal discharge operation is started again at the step 234 when the transportation by the rollers 6, 6a is started, whereby the discharged original proceeds through paths VIIa and VIa. On the other hand, upon completion of the normal feed operation, the original is positioned at IIa on the platen glass and is stopped in this position. The program proceeds to the inversion subroutine shown in FIGS. 23 and 24, and awaits the completion of the normal discharge operation in a step 243. Upon said completion the reversal subroutine is started, whereby the original proceeds through paths IIIa - IVa - Va - VIa - VIIa - IIa to stop on the determined position in the platen glass 12, and the copy start command is released in the feed finishing subroutine shown in FIG. 27.

The normal-feed-reversed-discharge operation is conducted by the normal-feed-reversed-discharge subroutine of a step 223 shown in FIG. 21. The original positioned at IIa on the platen glass 12 is discharged through the path IIIa according to the reversed discharge subroutine shown in FIG. 26 and proceeds through the path IVa, and said operation is temporarily suspended when the sensor S5 (17) detects the rear end of the original in a step 274. At this point the normal feed operation for the next original is started through the path Ia according to the normal-feed subroutine shown in FIG. 22. The reversed-discharge operation is started again when the transportation by the rollers 6, 6a is started in the step 234, and the discharged original is discharged through the paths Va-VIa. On the other hand the fed original passes through the paths Ia and IIa and stops at a determined position on the platen glass 12, when the copy start command is released in the feed finishing subroutine shown in FIG. 27.

Figure 23A:
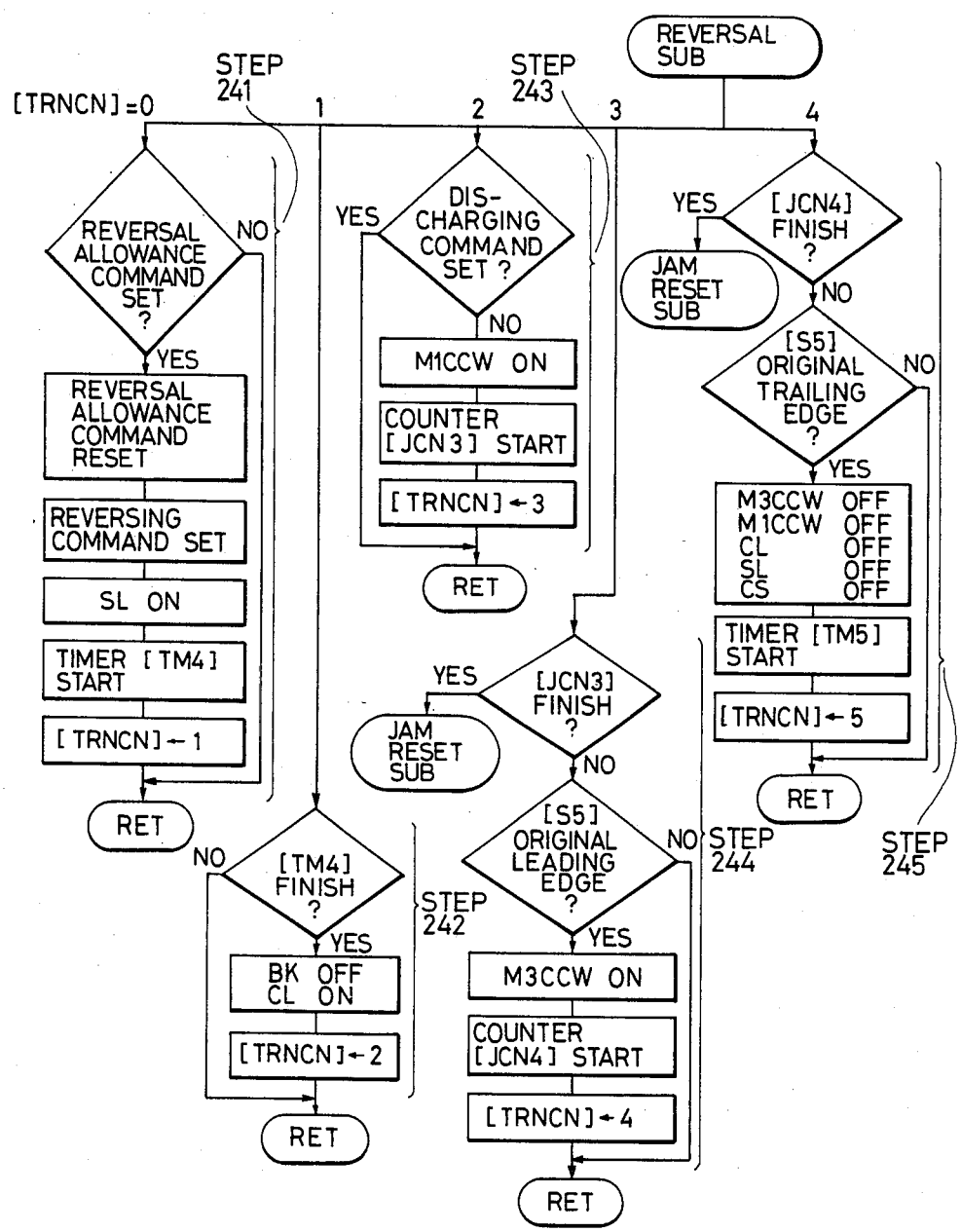
Figure 23B:
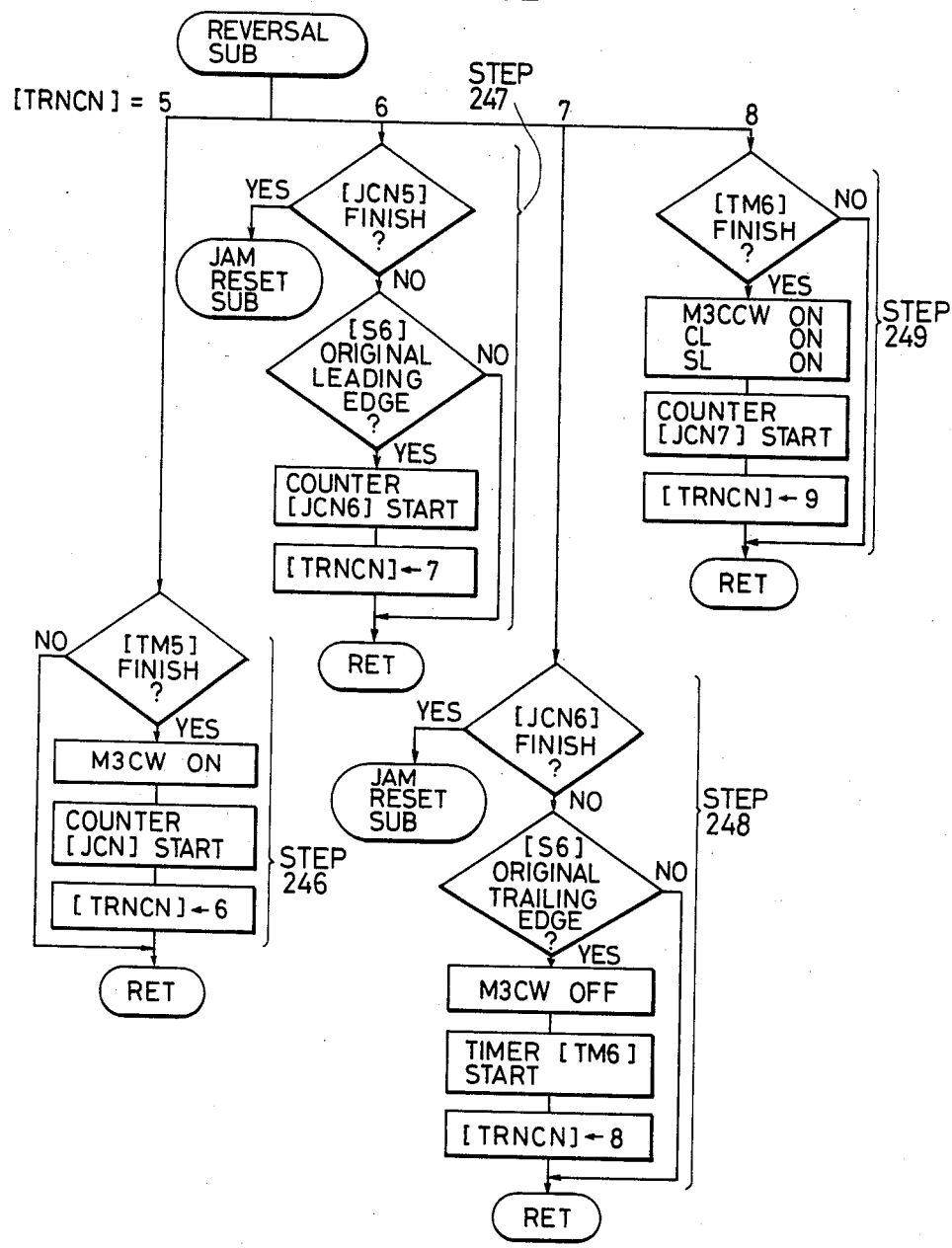
Figure 24:
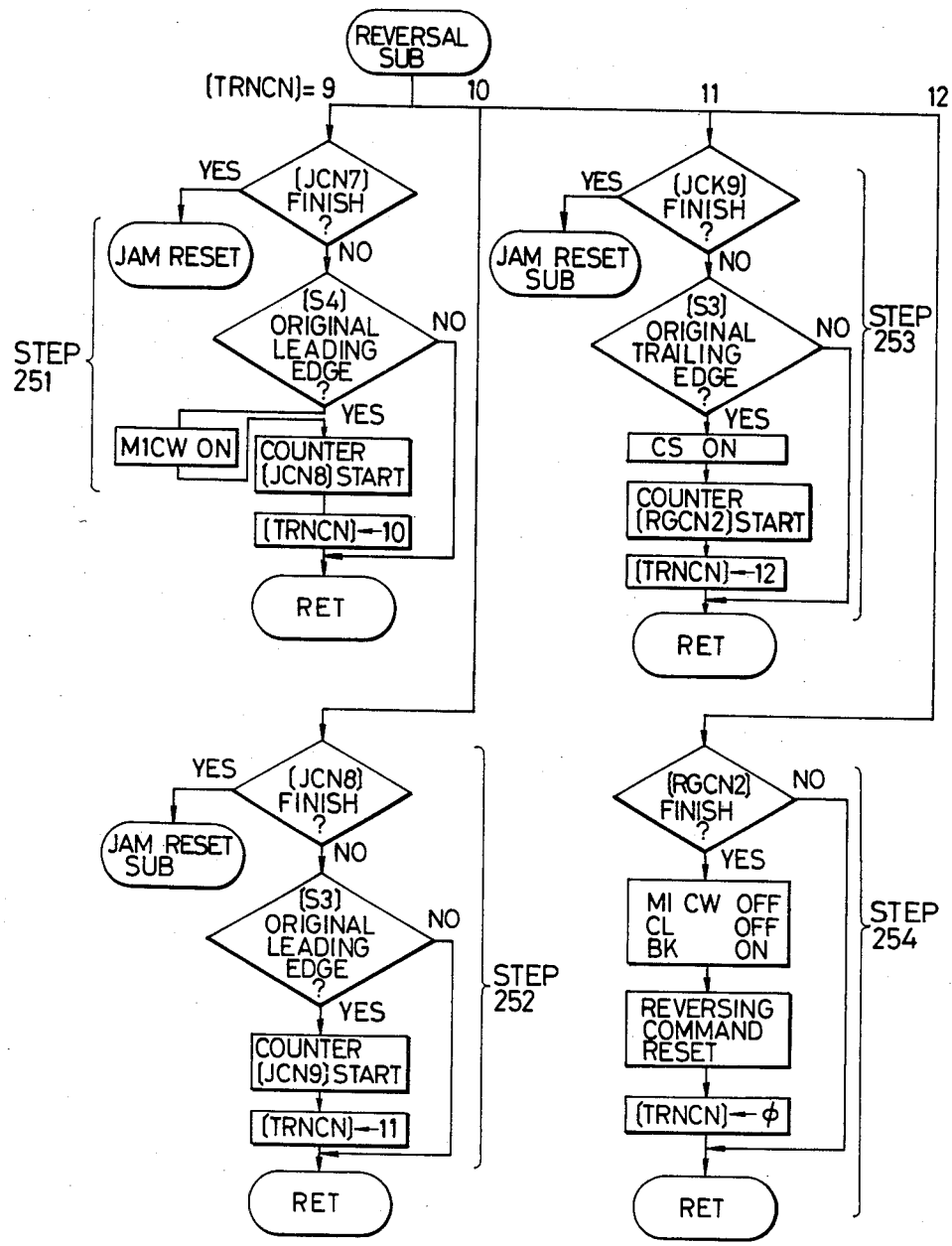

The reversal operation is conducted by the reversal subroutine of a step 225 shown in FIG. 21, wherein the original positioned at IIa on the platen glass 12 proceeds along the paths IIIa, IVa, Ia, VIa, VIIa and IIa according to the reversal subroutine shown in FIGS. 23 and 24. When said original stops at the determined position on the platen glass 12, the copy start command is released in the feed finishing subroutine shown in FIG. 27.

Figure 26A:
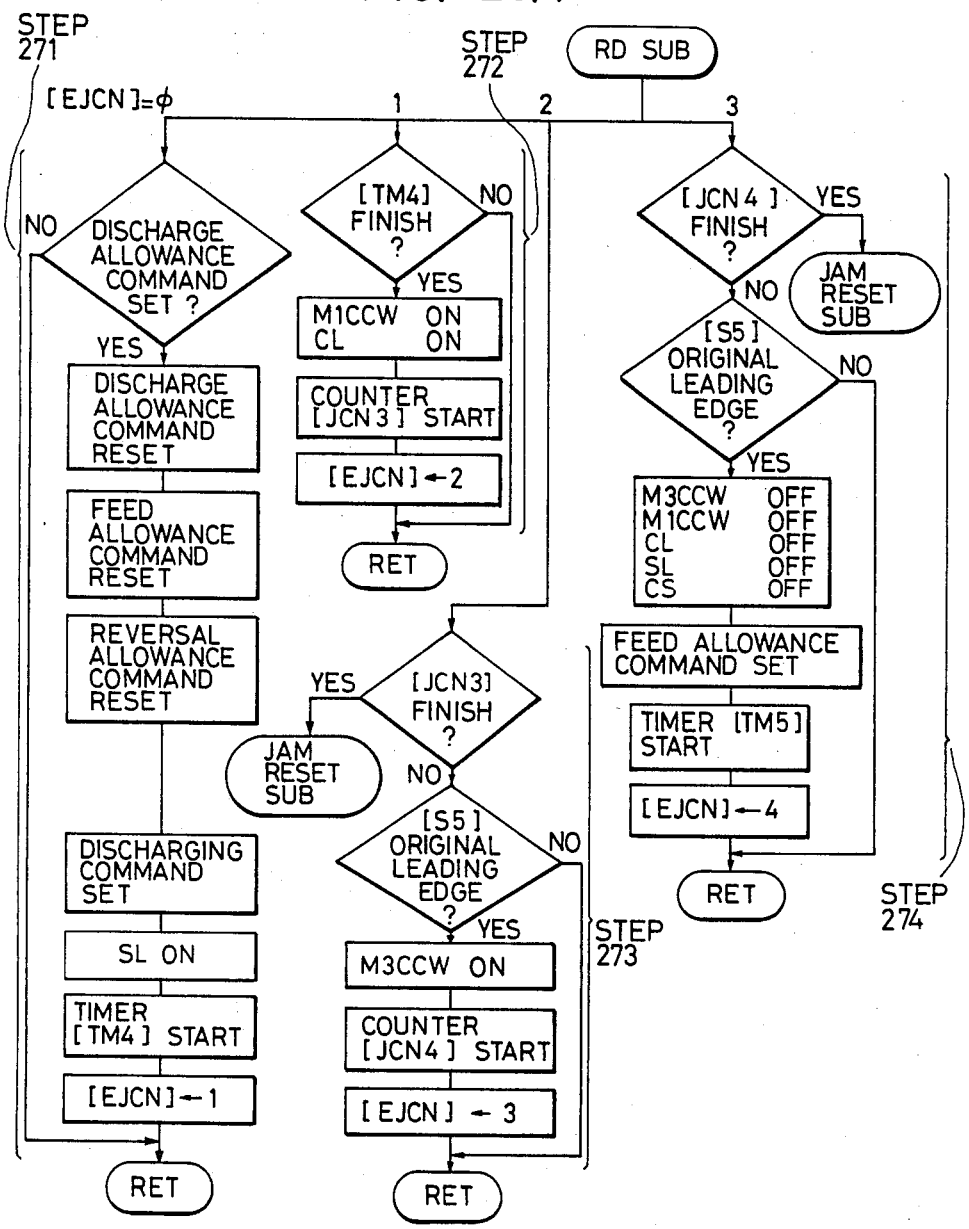
Figure 26B:
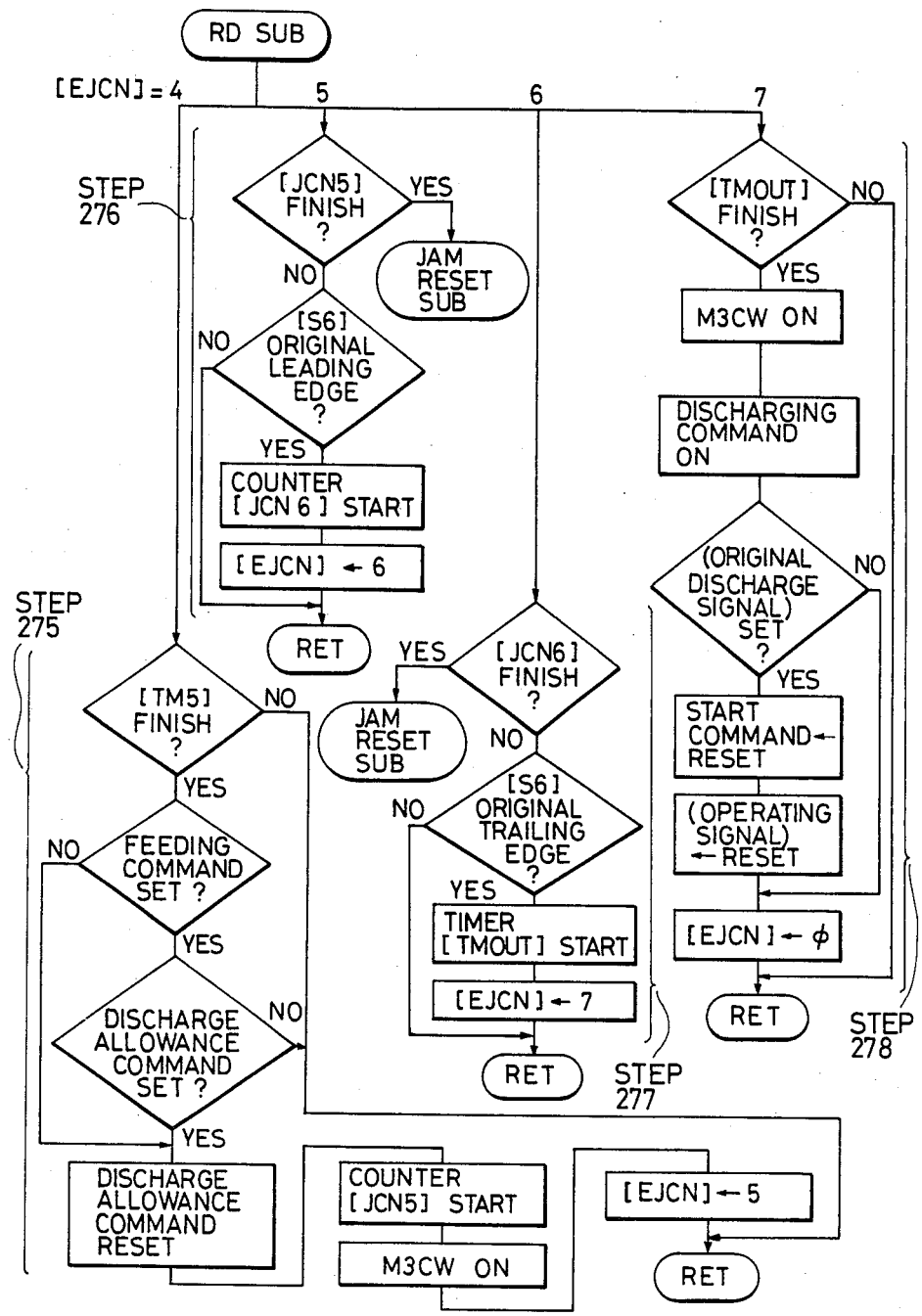

Now there will be explained the reversed-feed-reversed-discharge operation in case of employing two originals, while making reference to the normal-feed subroutine shown in FIG. 22, the reversal subroutine shown in FIGS. 23 and 24, and a flow chart of the reversed-discharge subroutine shown in FIG. 26. After two originals are placed on the original carrier tray 1, the reversed-feed-reversed-discharge operation in a step 224 of FIG. 21 where the copier selects the reversed-feed-reversed-discharge mode and sets the original feed signal. The first original is fed according to the normal-feed subroutine shown in FIG. 22 along the paths Ia and IIa, and, when it is placed in the determined position on the platen glass of the copier, the reversal enable command is set in a step 239, whereby the program proceeds to the reversal subroutine shown in Figs. 23 and 24.

In FIG. 23, as a table counter TRNCN is equal to zero, the program proceeds to a step 241 to initiate the reversing operation by checking the setting of the reversal enable command, to set the inversion enable command, to set the reversing command, to turn on the signal SL for energizing the path switching solenoid, to start an interval timer TM4 and to step up the table counter TRNCN to "1". Upon expiration of said timer TM4, a step 242 turns off the driving signal BK for the brake 92, turns on the driving signal CL for the clutch 85 and steps up the table counter TRNCN to "2". A step 243 checks the status of the discharging command and awaits the completion of the discharge operation. In this state said command is reset since the first original is being transported. Therefore the signal MICCW is turned on to start the inverted drive of the belt 8 whereby the original proceeds along the paths IIIa and IVa. Then a jam counter JCN3 is started for measuring the time to the sensor S5, and the table counter TRNCN is stepped up to "3". A next step 244 discriminates whether the sensor S5 (17) detects the leading end of the original before the expiration of the jam counter JCN3, and, if said counter expires without said detection, a delay jamming is identified and the program proceeds to the JAM RESET subroutine. If the detection is obtained in normal manner, the signal M3CCW is turned on to rotate the rollers 9, 9a, then a jam counter JCN4 is started for measuring the time required by the original to pass through the sensor S5, and the table counter TRNCN is stepped up to "4". A step 245 discriminates whether the sensor S5 detects the trailing end of the original before the expiration of the jam counter JCN4, and, if said counter expires without said detection, a stay jamming is identified and the program proceeds to the JAM RESET subroutine. On the other hand, if the operation is normal, the signals M3CCW, M1CCW, CL, SL and CS are all turned off to interrupt the original transportation in the path IVa, then an interval timer TM5 is started and the table counter TRNCN is stepped up to "5". A step 246 turns on the signal M3CW upon expiration of the interval timer TM5 to rotate the rollers 9, 9a thereby advancing the original to the path Va, then starts a jam counter JCN5 for measuring the time to the sensor S6 (18) and steps up the table counter TRNCN to "6". A step 247 discriminates whether the sensor S6 detects the leading end of the original before the expiration of the jam counter JCN5, and, if said counter expires without said detection, a delay jamming is identified and the program proceeds to the JAM RESET subroutine. On the other hand, if the operation is normal, the original proceeds, from the rollers 10, 10a to the rollers 11, 11a through the path VIa. Then a jam counter JCN6 for measuring the time required by the original to pass through the sensor S6, and the table counter TRNCN is stepped up to "7". A step 248 discriminates whether the sensor S6 detects the trailing end of the original before the expiration of the jam counter JCN6, and, if said counter expires without said detection, there is identified a stay jamming and the program proceeds to the JAM RESET subroutine. On the other hand, if the operation is normal, the signal M3CW is turned off to stop the original in the path VIa, then an interval timer TM6 is started and the table counter TRNCN is stepped up to "8". A step 249 turns on the signals M3CCW, CL and SL upon expiration of said interval timer TM6 thereby advancing the original to the path VIIa by means of the rollers 10, 10a, also starts a jam counter JCN7 for measuring the time to the sensor S4, and steps up the table counter TRNCN to "9". Referring to FIG. 24, a step 251 discriminates whether the sensor S4 detects the leading end of the original before the expiration of the jam timer JCN7, and, if said timer expires without said detection, there is identified a delay jamming and the program proceeds to the JAM RESET subroutine. On the other hand, if the operation is normal, a jam counter JCN8 is started for measuring the time to the sensor S3, the signal M1CW is turned on and the table counter TRNCN is stepped up to "10". A step 252 discriminates whether the sensor S3 detects the leading end of the original proceeding in the path VIIa before the expiration of the jam counter JCN8, and, if said counter expires without said detection, there is identified a delay jamming and the program proceeds to the JAM RESET subroutine. On the other hand, if the operation is normal, a jam timer JCN9 is started to measure the time required by the original to pass through the sensor S3, and the table counter TRNCN is stepped up to "11". A step 253 discriminates whether the sensor S3 detects the trailing end of the original before the expiration of the jam counter JCN9, and, if said counter expires without said detection, a stay jamming is identified and the program proceeds to the JAM RESET subroutine. On the other hand, if the operation is normal, the original leaves the rollers 6, 6b and proceeds in the path IIa by means of the belt 8. At this point the signal CS is turned on to shift the clock signals entering the interruption port INT from the transport clock signals to the belt clock signals, then a registration counter RGCN2 corresponding to the transport distance to the determined position on the platen glass of the copier is started without change in the relationship between the clock signals and the transport distance, and the table counter TRNCN is stepped up to "12". Upon expiration of the registration counter RGCN2, a step 254 turns off the signals M1CW and CL and turns on the signal BK to achieve exact stop position, then resets the reversing command and also resets the table counter TRNCN to zero. In this manner the reversal operation is completed.

In this state the reversed feed sequence is terminated, and the program proceeds to the feed finish subroutine shown in FIG. 27. Subsequently the original feed finish signal is set as explained before to start the copying operation in the copier for the first original.

In the following there will be explained the reversed discharge operation for the first original and the reversed feed operation for the second original after the completion of the copying operation for the first original. Upon completion of the copying operation, the copier sets the original feed signal, and, since the reversed-feed-reversed-discharge mode is selected, a step 224 shown in FIG. 21 is executed to start the reversed discharge operation for the first original. In the reversed discharge subroutine shown in FIG. 26, there is executed a step 271 as a table counter EJCN is equal to zero. Since the discharge enable command is set in the step 234 shown in FIG. 22, the step 271 resets the discharge enable command, feed enable command and reversal enable command to prohibit the normal feed and reversal, sets the discharging command, turns on the signal SL to guide the discharged original to the path IIIa, starts the interval timer TM4 and steps up the table counter EJCN to "1". A next step 272 turns on the signal M1CCW and CL, upon expiration of the interval timer TM4, to initiate the original discharge along the path IIIa, then starts a jam counter JCN3 for measuring the time to the sensor S5, and steps up the table counter EJCN to "2". A step 273 discriminates whether the sensor S5 detects the leading end of the original before the expiration of the jam counter JCN3, and, if it expires without said detection, there is identified a delay jamming and the program proceeds to the JAM RESET subroutine. On the other hand, if the operation is normal, the signal M3CCW is turned on to drive the rollers 9, 9a thereby advancing the original along the path IVa, then a jam counter JCN4 is started for measuring the time required by the original to pass through the sensor S5, and the table counter EJCN is stepped up to "3". A step 274 discriminates whether the sensor S5 detects the trailing end of the original before the expiration of the jam counter JCN4, and, if it expires without said detection, there is identified a stay jamming and the program proceeds to the JAM RESET subroutine. On the other hand, if the operation is normal, the signals M3CCW, M1CCW, CL, SL and CS are turned off to stop the original in the path IVa. Simultaneously the feed enable command is set to initiate the reversed feed operation of the second original, thus resolving the standby state of the step 231 shown in FIG. 22, and the feeding command is set to initiate the separation of the second original. Then an interval timer TM5 is started, and the table timer EJCN is stepped up to "4". A step 275 enters a standby state, until the setting of the feeding command and the discharge enable command after the expiration of the interval timer TM5. On the other hand the feeding of the second original proceeds, and the discharge enable command is set at the step 234 shown in FIG. 22. Therefore, a step 275 resets the discharge enable command, turns on the signal M3CW to guide the discharged original from the path IVa to Va, starts a jam timer JCN5 for measuring the time to the sensor S6, and steps up the table counter EJCN Z5 to "5". A step 276 discriminates whether the sensor S6 detects the leading end of the original before the expiration of the jam timer JCN5, and, if it expires without said detection, there is identified a delay jamming and the program proceeds to the JAM RESET subroutine. On the other hand, if the operation is normal, the original proceeds to the path VIa through the rollers 10, 10a, then a jam counter JCN6 for measuring the time required by the original to pass through the sensor S6, and the table counter is stepped up to "6". A step 277 discriminates whether the sensor S6 detects the trailing end of the original before the expiration of the jam counter JCN6, and, if it expires without said detection, there is identified a stay jamming and the program proceeds to the JAM RESET subroutine. On the other hand, if the operation is normal, the original proceeds along the path VIa to reach the rollers 11, 11a, then a post-rotation timer TMOUT is started, and the table counter EJCN is stepped up to "7". Upon expiration of said timer TMOUT, a step 278 turns of the signal M3CW, stops the discharge drive, resets the discharging command and resets the table counter EJCN to zero as explained before, whereby the program returns to the step 271 and enters the standby state. On the other hand, the feeding process, awaiting the resetting of the discharging command in the step 243 in FIG. 23, re-starts the reversal operation, then executes the feed finishing operation from the step 281 shown in FIG. 27, and instructs a copying operation for the second original to the copier.

The reversed discharge operation for the second original executes the discharging operation alone since the original discharge signal is set by the copier as explained before. Thus the steps 271 to 278 in the reversed discharge subroutine in FIG. 26 are executed, and a step 278 resets the start command and the operating signal because of the set state of the original discharge signal, thus terminating all the operations.

Figure 28:
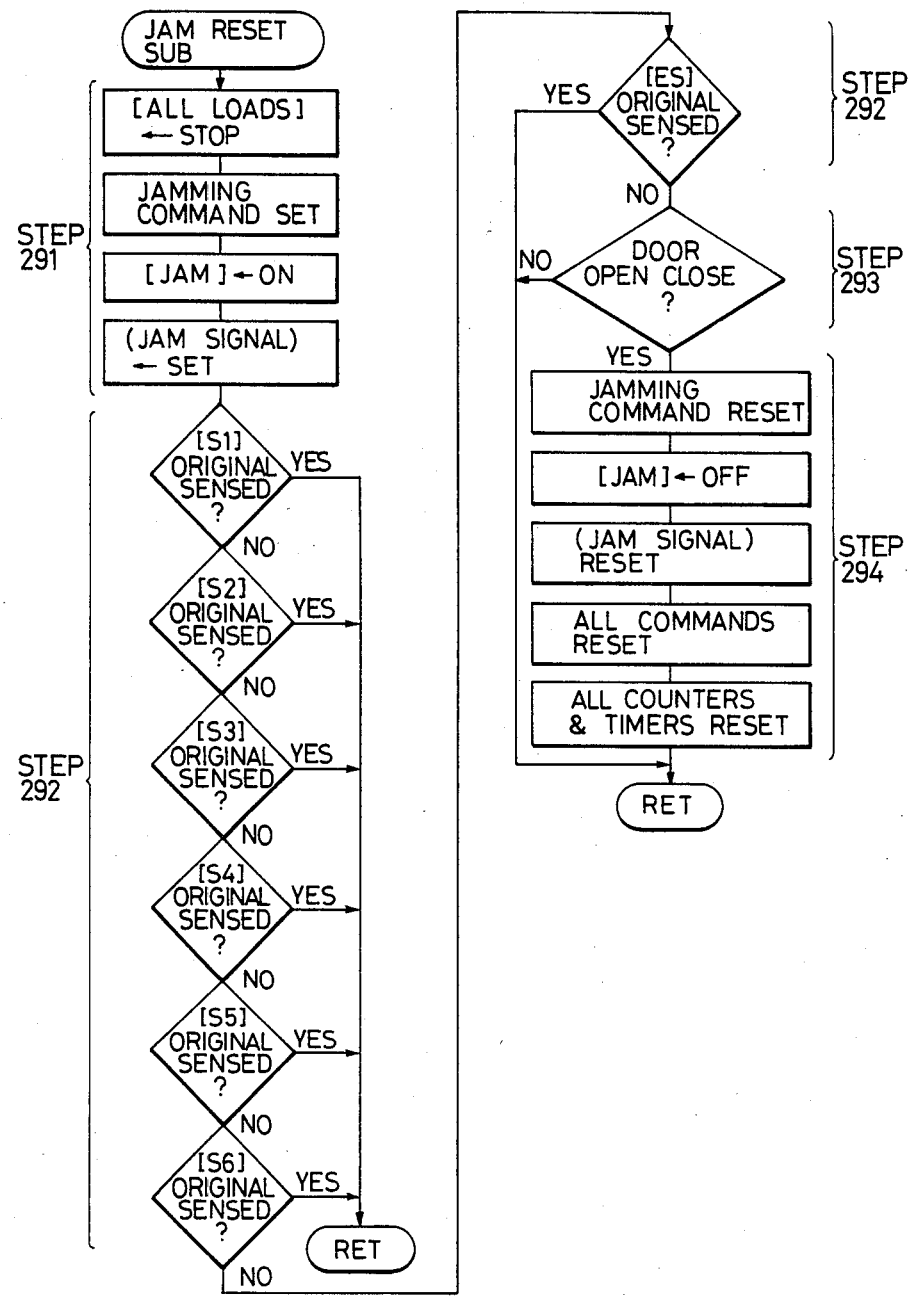

Now there will be explained the JAM RESET subroutine. Referring to FIG. 28, a step 291 turns off all the loads, sets the jamming command, turns on a signal JAM from the output port 011 and turns on a jam lamp 24. Then it sets the JAM signal in the serial data. Subsequently a step 292 identifies whether any of the sensors S1-S6, ES detects the original, and, in the presence of any detection, the program does not proceed to the next step. It proceeds to a step 293 when the operator removes all the originals to turn off all the detection signals from the sensors. The step 293 identifies the door manipulation by the operation, and a step 294 resets the jamming command, turns of the JAM signal from the output port 011, resets the JAM signal, JAM signal, all the counters and timers to complete the JAM RESET operation.

Now there will be explained the original size detecting procedure conducted by the SIZECK subroutine shown in FIG. 31. A fed original is counted by the original size counter during the detection thereof by the sensor S2 in response to the transport clock and belt clock signals, namely from the leading end to the trailing end, and data corresponding to the size are stored. The original size is identified by comparing said data with those of predetermined sizes from A3 size to B5 size. As an example the A4 size is identified from a relationship B5R > original size counter ≧ A4 data, and a signal "1" is set in the original size signal of the serial data to be supplied to the copier. After the size is discriminated, the original size counter is cleared for the detection of the size of a next original, so that the original size is checked for each original fed. In case the original after the size detection is subjected to an inversion or discharge operation, each sensor is provided with a stay jamming counter, and an exact stay jam detection is rendered possible by providing the data of said counter with an additional margin.

Figure 29B:
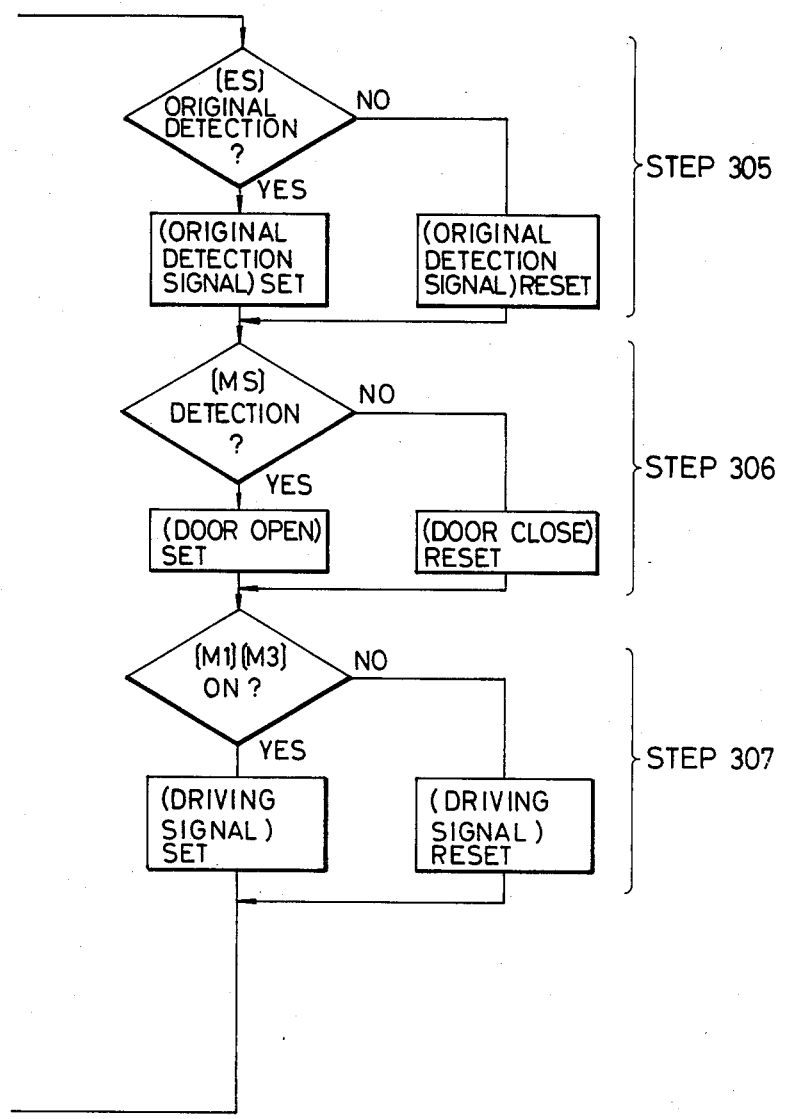
Figure 30:
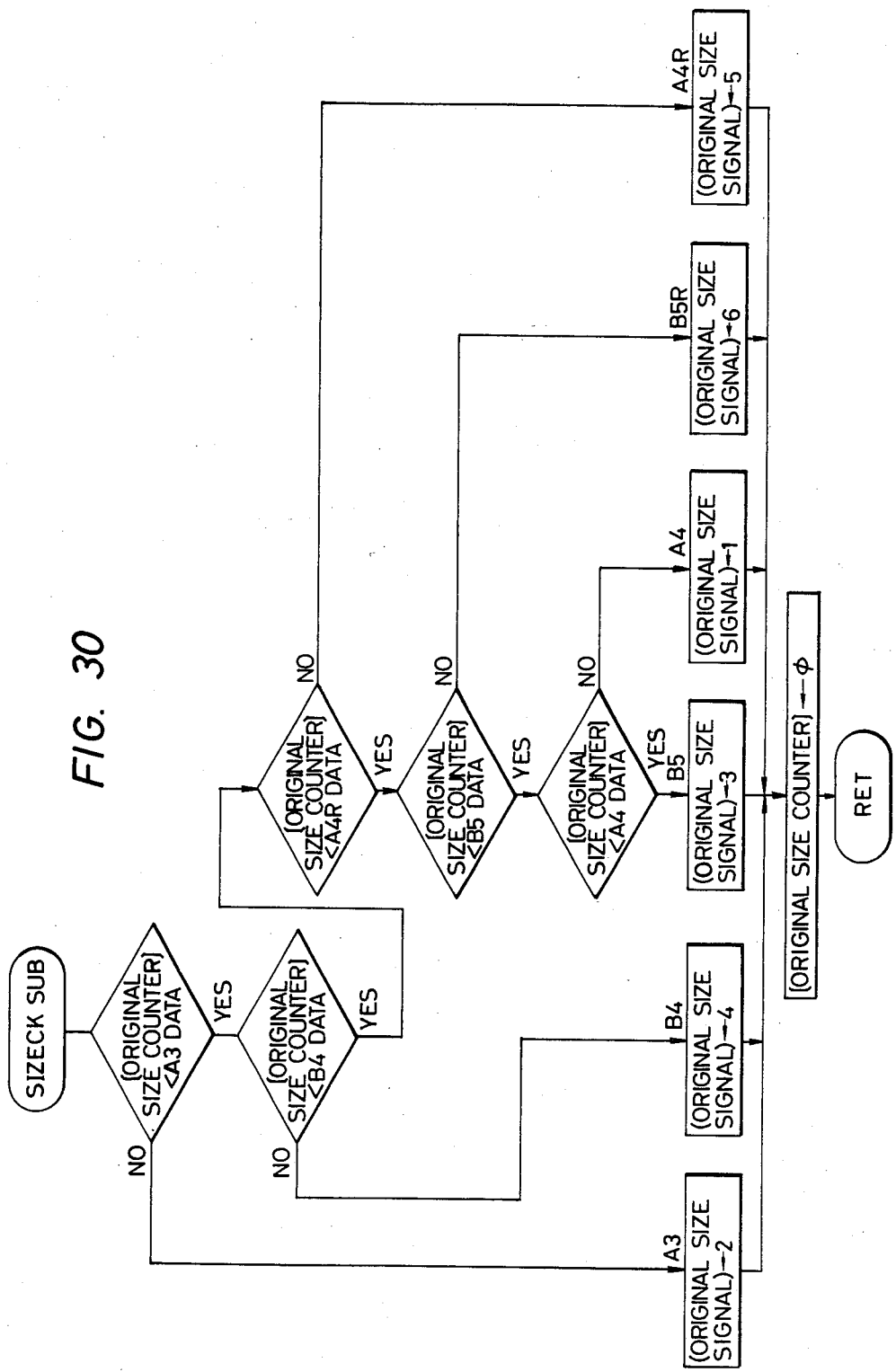

Now there will be explained the serial transfer process, with reference to FIG. 29 showing a flow chart for serial communication with the aforementioned main unit. A step 301 checks the entry of a request signal REQ from the main unit for requesting the serial communication, and initiates the serial communication in response to said entry. A step 302 stores, in a data register SiREG for supplying data to the port S0 of the microcomputer 120 for data transmission to the main unit, the aforementioned 8-bit serial data (FLDO1)(FLDO2) (FLDO3) according to the content of a counter SOCN, supplies the content of said register SiREG to the port S0, and turns on the acknowledge signal ACK for informing the main unit that it is ready for serial communication. The serial communication between the main unit B and the present apparatus A is automatically conducted according to the μCOM43N, and 8-bit data are exchanged until the end of communication is checked in a step 303. Upon termination of the serial communication, a step 304 turns off the acknowledge signal ACK, and the data from the main unit received by the port Sl of the microcomputer 120 are stored in the register SiREG, of which content is then stored in the aforementioned FLDil. Also the content of said counter S0CN is stepped up, and, if S0CN=3, it is again reset to zero. In this manner the content of S0CN is renewed for each serial communication, so that the serial communication data to be stored in the register SiREG are cyclically changed in the order of FLDO1, FLDO2, FLDO3, . . .

In the absence of the request signal REQ in the step 301, the serial communication is not conducted, and the program proceeds to steps 305, 306 and 307 to set/reset the data of (FLDO1) (FLDO2) (FLDO3).

The step 305 sets or resets the data (original detection signal) in FLDO2 according to whether the original sensor ES (20) detects an original. The step 306 sets or resets the data (door open signal) in FLDO3 according to whether the switch MS (126) provides the detection signal. The step 307 sets or resets the data (driving signal) in FLDO1 according to whether the motor M1 (82) and M2 (97) are driven.

Figure 31:
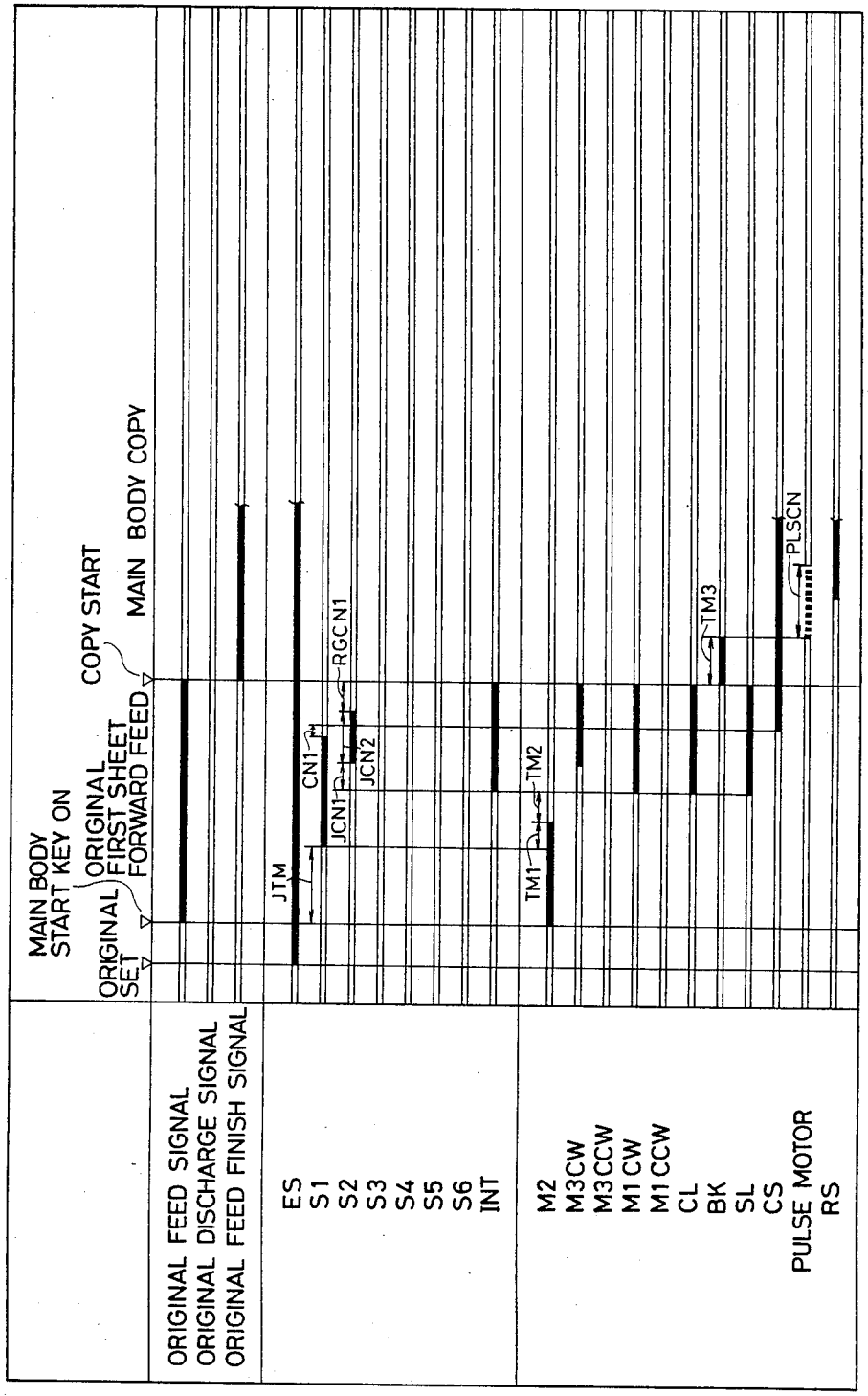
Figure 32:
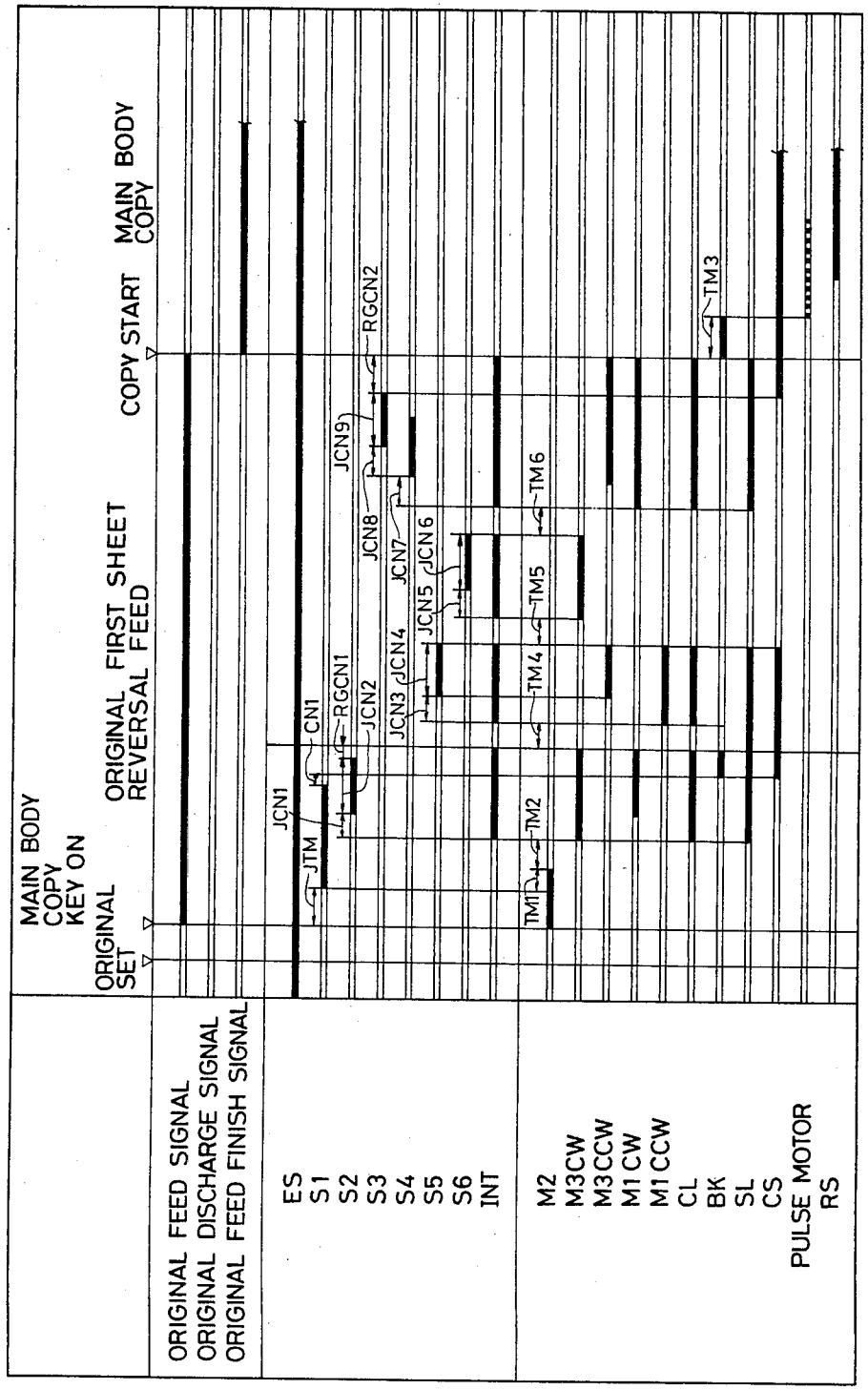
Figure 33:
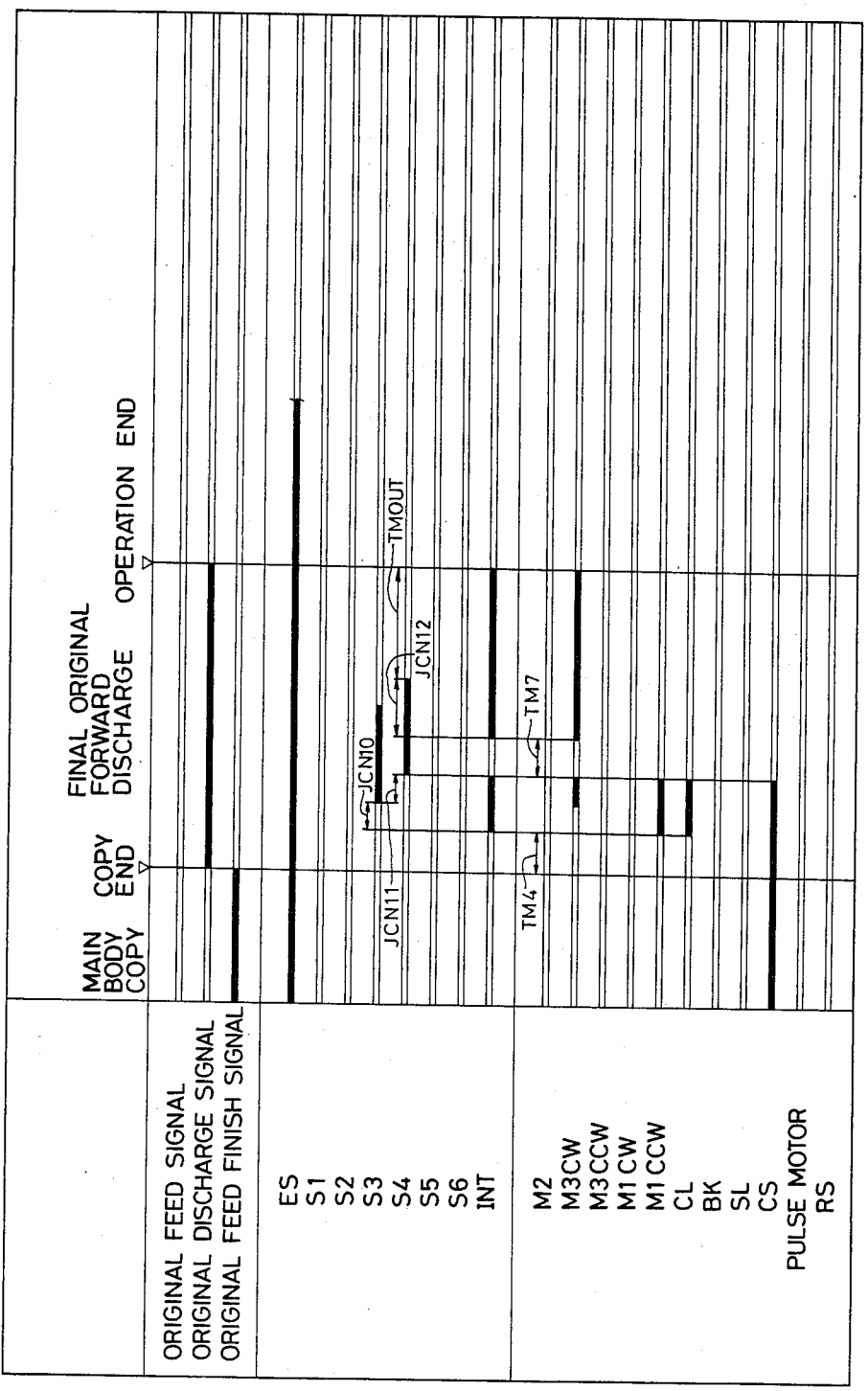
Figure 34:
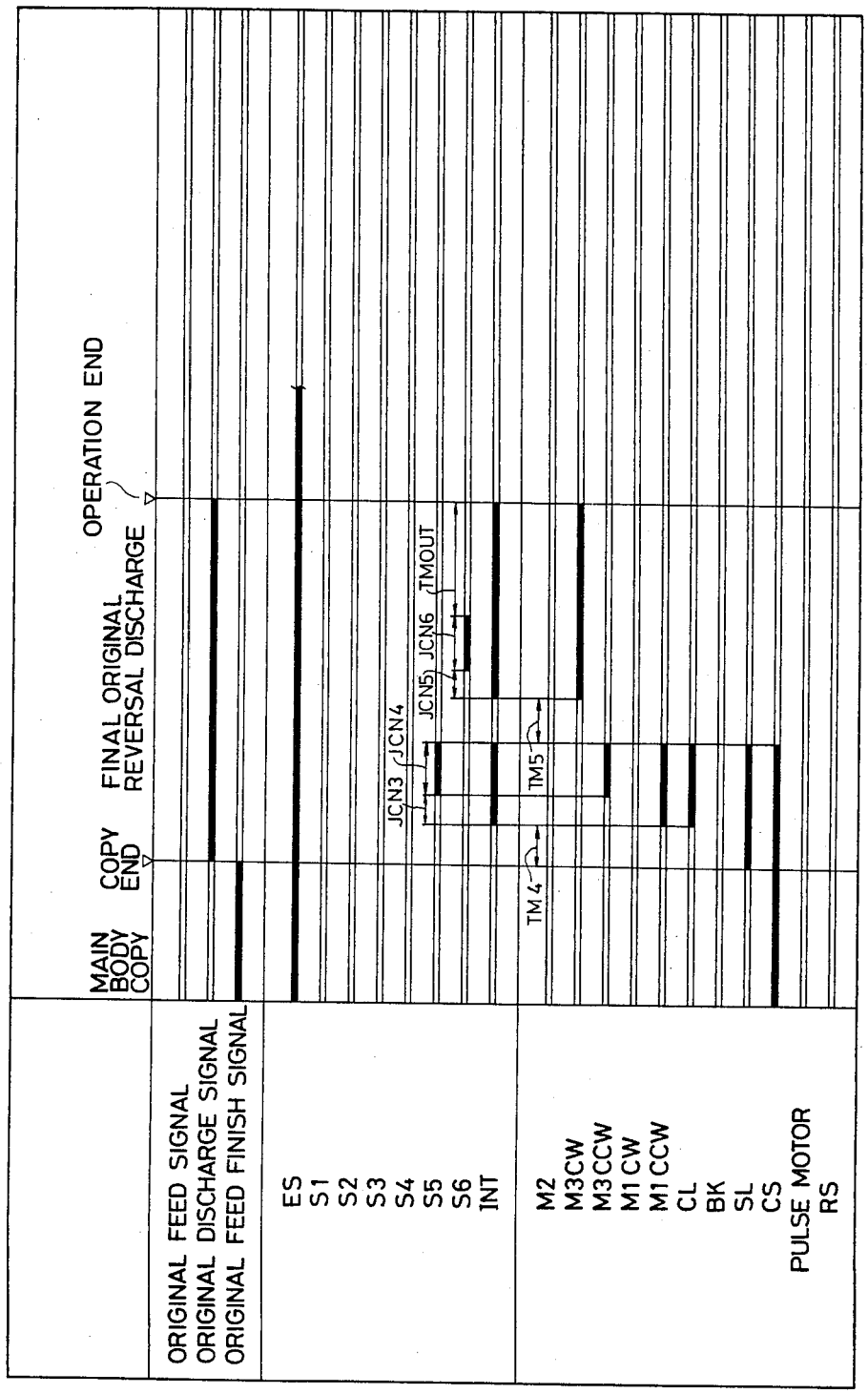
Figure 35:
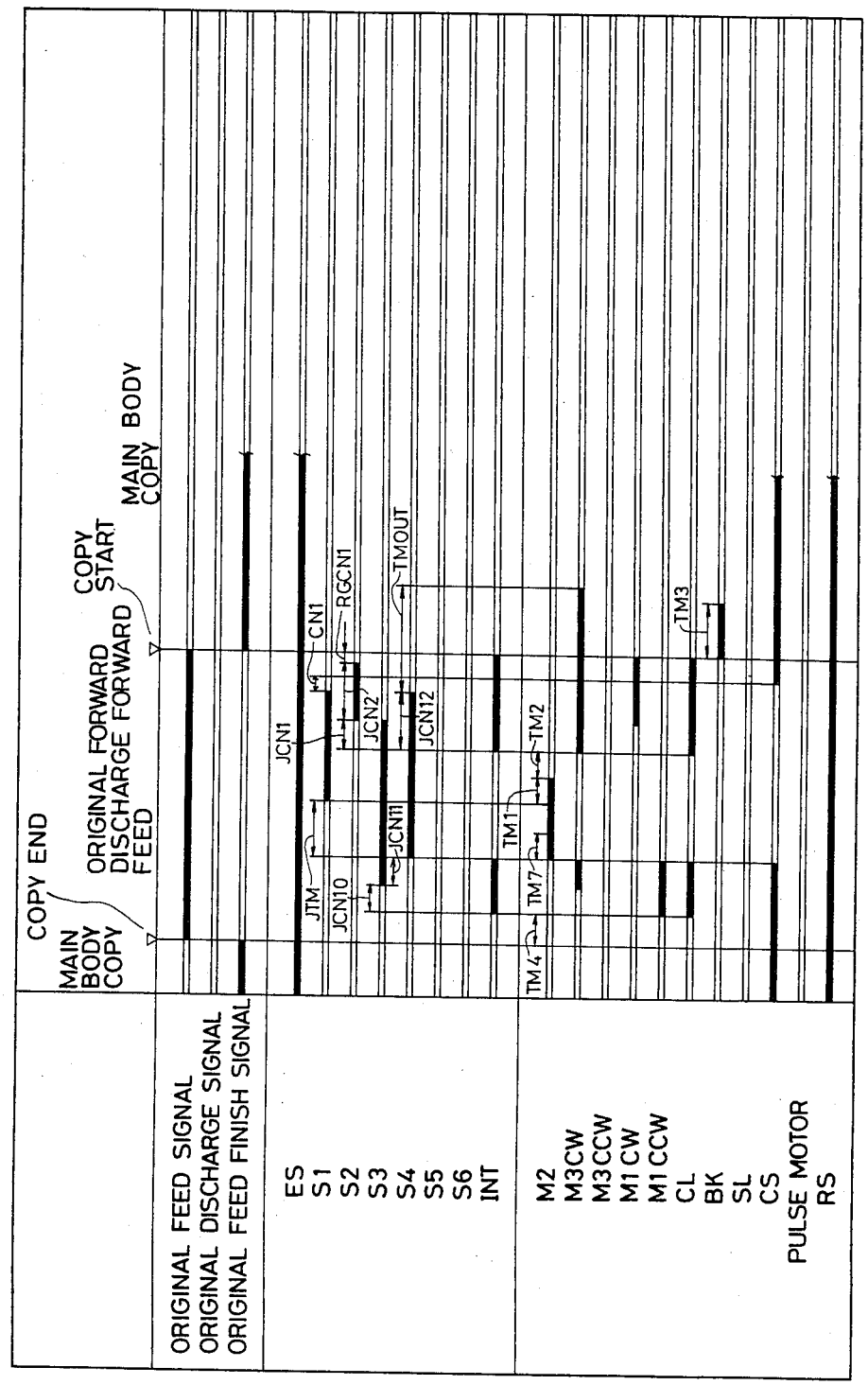
Figure 36:
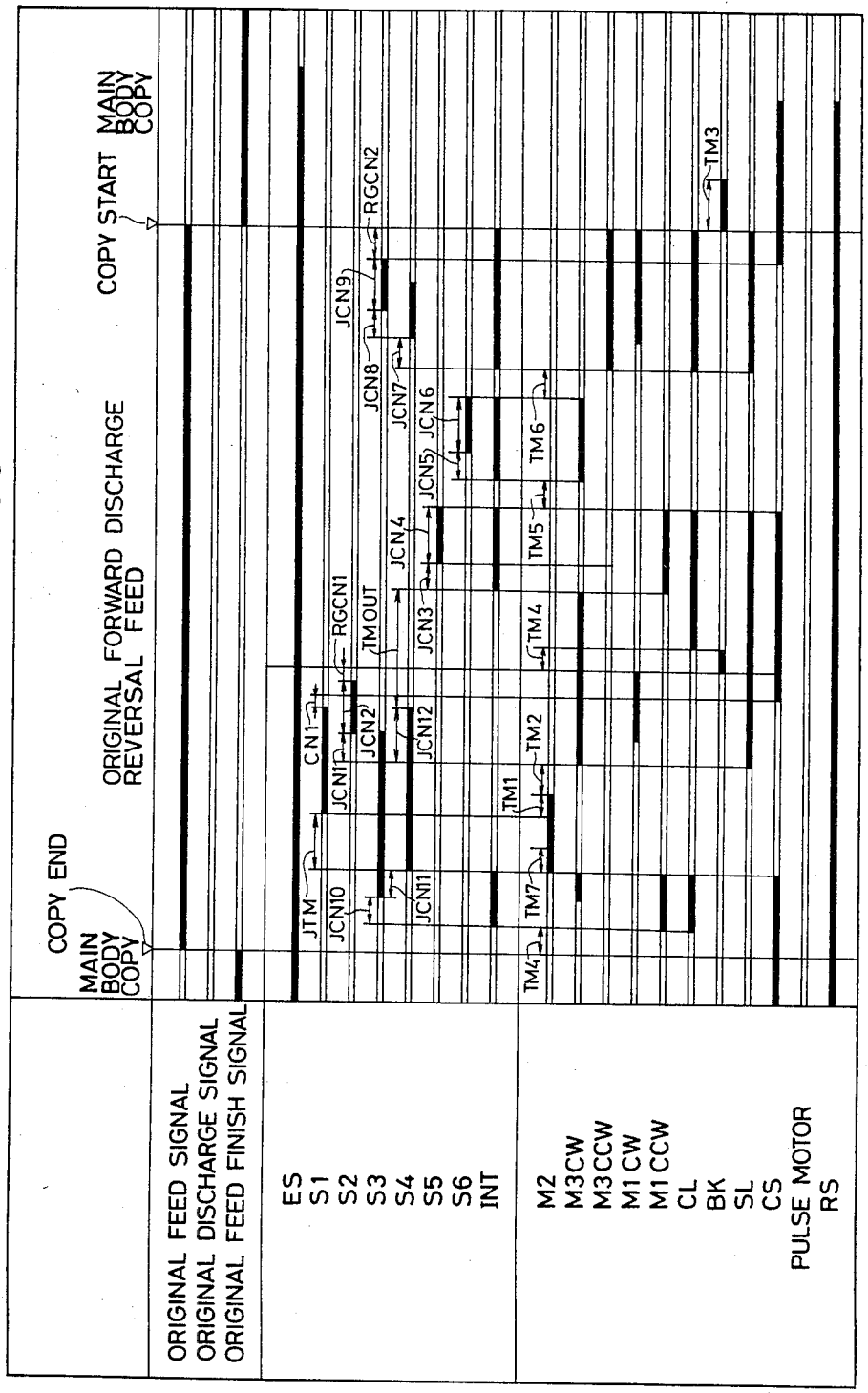
Figure 37:
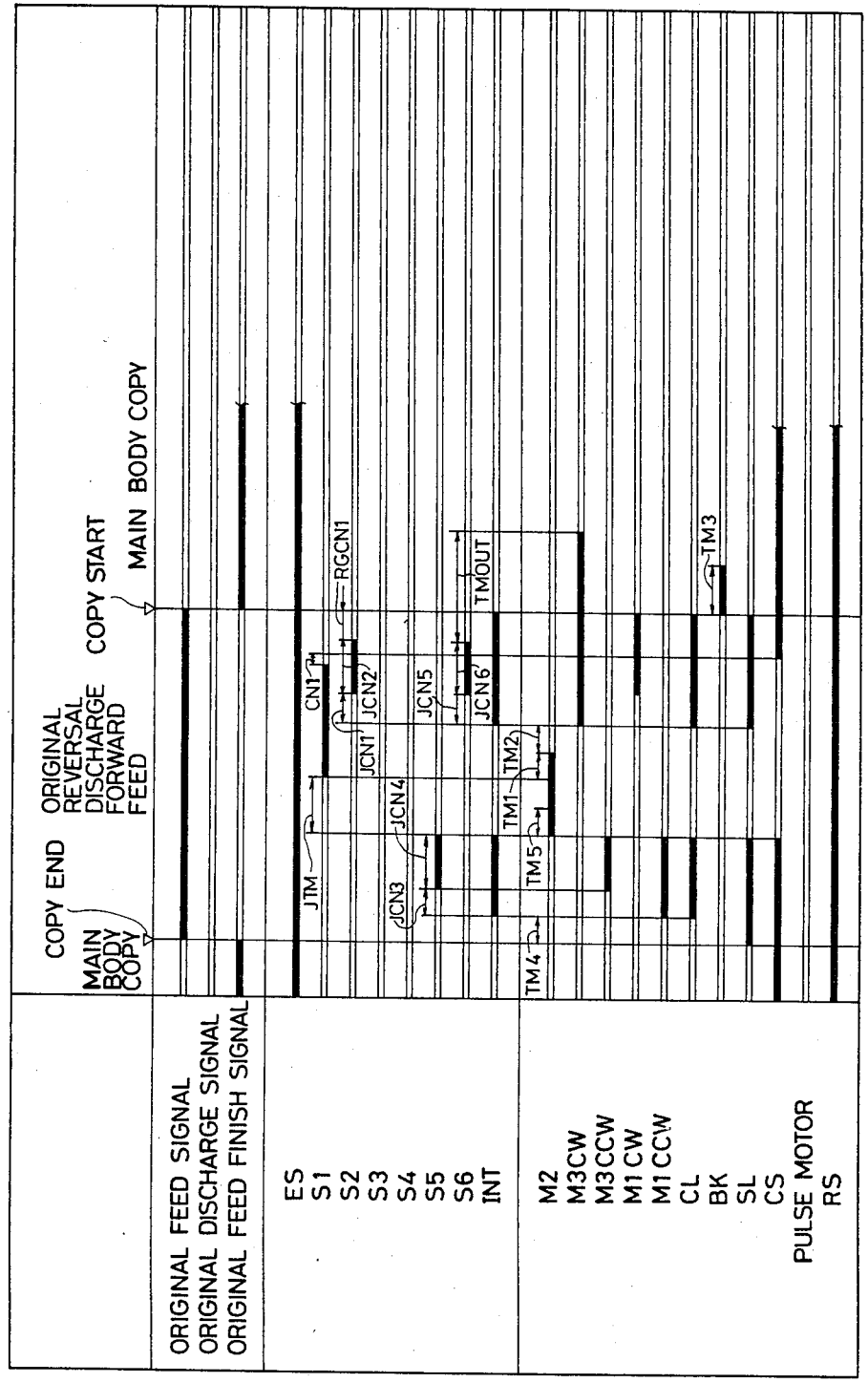
Figure 38:
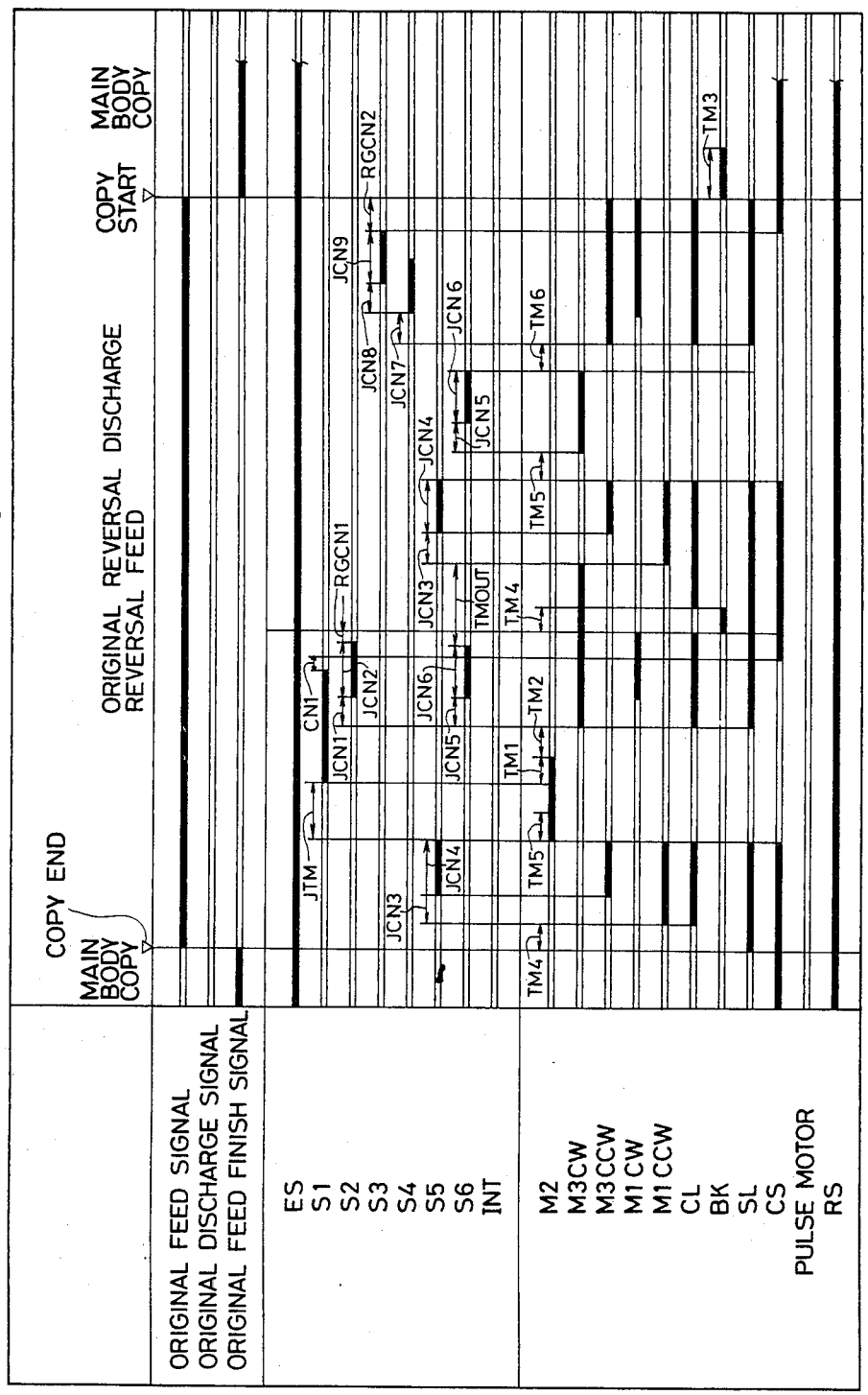

FIGS. 31 to 39 are timing charts of the various parts of the feeding apparatus in each of the operating modes according to the above-explained flow charts, wherein FIG. 31 represents a case of normal feed of the first original, FIG. 32 is a case of reversed feed of the first original, FIG. 33 is a case of normal discharge of the last original, FIG. 34 is a case of reversed discharge of the last original, FIG. 35 is a case of normal feed and normal discharge of the originals, FIG. 36 is a case of reversed feed and normal discharge of the originals, FIG. 37 is a case of normal feed and reversed discharge of the originals, FIG. 38 is a case of reversed feed and reversed discharge of the originals, and FIG. 39 is a case of inversion of the original.

The reflective sensors in the foregoing embodiment may be replaced by transmission sensors, microswitches, lead switches etc.

In the foregoing embodiment the counter is composed of a software utilizing the interruption port INT of the microcomputer, but it can also be composed of a hard logic circuit uitlizing a counter IC.

Furthermore, in the foregoing embodiment, the interruption port receives only one clock signal selected by switching means, but the objects of the present invention are also achievable by entering all the clock signals into the input ports and selecting said signals in the software of the microcomputer.

Besides the clock signals may be generated for example by a pulley rotated by the transported original instead of the movement of the transporting means.

We claim:

1. An automatic original feeding apparatus for automaticaly feeding both first and second faces of an original to an image reading position for image reading, comprising:

supporting means for supporting originals thereon;

feed means for separating one by one the originals on said supporting means to send out a thus separated original;

a sheet feeding path for leading the original sent out from said separation feed means while irverting the original;

conveying means for conveying the original led by said sheet path to said reading position and thereafter discharging the original therefrom in a directior opposite to the direction in which the original was led thereto; and a sheet inverting path for leading the original discharged from the reading position to said conveying means, while inverting said original, from the same side of said apparatus as that through which the original has been discharged such that said discharged end thereof becomes a leading end;

wherein the original is once transported through said sheet feeding path, said conveying means and said sheet inverting path without having been read, such that the original is led to the reading position and the first face of the original is then read at the reading position; and thereafter, the original is inverted through said conveying means and said sheet inverting path such that the original is led to the reading position, and the second face of the original is read at the reading position, without returning said original to said supporting means until both faces are presented for reading.

2. An image forming apparatus provided with an automatic original feeding apparatus for automatically feeding both first and second faces of an original to an image reading position for image reading, comprising:

an image bearing member;

reading means provided at the reading position;

image forming means for forming, on said image bearing member, an image corresponding to an image of the original read by said reading means;

a transfer unit for transferring the image formed on said image bearing member by said image forming means onto a sheet;

original supporting means for supporting sheet originals thereon;

separation feed means for separating the originals supported by said supporting means one by one to send out a thus separated original;

a sheet feeding path for leading the original sent out from said separation feed means while inverting the original;

conveying means for conveying the original led by said sheet path to the reading position and thereafter discharging the original therefrom in a direction opposite to the direction in which the original was led thereto;

a sheet inverting path for leading the original discharged from the reading position to said conveying means, while inverting said original, from the same side of said apparatus as that through which the original has been discharged such that said discharged end thereof becomes a leading end;

means for guiding the sheet to said transfer unit in such a manner that the image formed on said image bearing member by said image forming means corresponding to the first face of the original is transferred onto a first face of the sheet, and thereafter the image corresponding to the second face of the original is transferred onto a second face of the sheet;

wherein the original is once transported through said sheet feeding path, said conveying means and said sheet inverting path without having been read, such that the original is led to the reading position and the first face thereof is read at the reading position; and thereafter, the original is inverted through said conveying means and said sheet inverting path such that the original is led to the reading position and the second face thereof is read at the reading position, without returning said original to said supporting means until both faces are presented for reading.

3. An automatic original feeding apparatus according to claim 1 or an image forming apparatus according to claim 2, wherein said supporting means is an original carrier tray.

4. An automatic original feeding apparatus according to claim 1 or an image forming apparatus according to claim 2, wherein said feed means comprises belts rotated in mutually opposed manner.

5. An automatic original feeding apparatus according to claim 1 or an image forming apparatus according to claim 2, wherein said supporting means supports the originals to be fed and the returned originals.

6. An automatic original feeding apparatus according to claim 1 or an image forming apparatus according to claim 2, further comprising means for returning the origiral, after reading of the second face of the original, to said supporting means through the same side of the reading position as that through which the original has been fed to the reading position.

7. A sheet-original reading apparatus comprising:

original supporting means for supporting sheet originals thereon;

separation feed means for separating the originals supported by said supporting means one by one to send out a thus separated original;

a first sheet path for leading the original sent out from said separation feed means while inverting the original;

conveying means for conveying the original led by said first sheet path to a predetermined reading position and thereafter discharging the original therefrom in a direction opposite to the direction in which the original was led thereto;

a second sheet path for effecting a first stitch-back of the original discharged from the predetermined reading position; and a third sheet path for effecting a second switch-back of the original led by said second sheet path after the first switch-back to lead the thus inverted original to said conveying means, wherein the original is once transported through said first sheet path, said conveying means, said second sheet path and said third sheet path without having been read, such that the original is led to the predetermined reading position and a first face of the original is then read at the predetermined reading position; and thereafter, the original is inverted through said conveying means, said second sheet path and said third sheet path such that the original is led to the predetermined reading position, and a second face of the original is read at the predetermined reading position.

8. An apparatus according to claim 7, further comprising means for returning the original, after reading of the second face of the original, to the supporting means from the same side of the reading position as that through which the original has been fed to the reading position.

9. An image forming apparatus provided with an automatic original feeding apparatus for automatically feeding both first and second faces of an original to a predetermined image reading position for image reading, comprising:

a image bearing member;

reading means provided at the predetermined image reading position;

image forming means for forming, on said image bearing member, am image corresponding to an image of the original read by said reading means;

a transfer unit for transferring the image formed on said image bearing member by said image forming means onto a sheet;

original supporting means for supporting sheet originals thereon;

separation feed means for separating the originals supported by said supporting means one by one to send out a thus separated original;

a first sheet path for leading the original sent out from said separation feed means while inverting the original;

conveying means for conveying the original led by said first sheet path to the reading position and thereafter discharging the original therefrom in a direction opposite to the direction in which the original was led thereto;

a second sheet path for effecting a first switch-back of the original discharged from the reading position;

a third sheet path for effecting a second switch-back of the original led by said second sheet path after the first switch-back to lead the thus inverted original to said coveying means; and means for guiding the sheet to said transfer unit in such a manner that the image formed on said image bearing member by said image forming means corresponding to the first face of the original is transferred onto a first face of the sheet, and thereafter the image corresponding to the second face of the original is transferred onto a second face of the sheet, wherein the original is once transported through said first sheet path, said conveying means, said second sheet path and said third sheet path without having been read, such that the original is led to the reading position, and a first face thereof is read at the reading position; and thereafter, the original is inverted through said conveying means, said second sheet path and said third sheet path such that the original is led to the reading position and a second face thereof is read at the reading position.

10. An apparatus according to claim 9, further comprising means for returning the original, after reading of the second face of the original by said reading means, to the supporting means from the same side of the reading position as that through which the original has been fed to the reading position.

* * * * *

UNITED STATES PATENT AND TRADEMARK OFFICE
CERTIFICATE OF CORRECTION

PATENT NO. : 4,727,398

DATED : February 23, 1988

INVENTOR(S) : TAKESHI HONJO, ET AL.

It is certified that error appears in the above-identified patent and that said Letters Patent is hereby corrected as shown below:

IN THE ABSTRACT [57]:

Line 8, "inverting" should read --inverting,--;

Line 10, "means" should read --device--;

Line 15, "sides" should read --side--; same line, "side" should read --sides--.

COLUMN 1, line 8, "a" (first occurrence) should read --an--.

COLUMN 2, line 19, "two side" should read --two-side--;

line 33, "and FIGS. 31 to 39" should read --and FIGS. 31 to 39--;

line 53, "the" (first occurrence) should be deleted; same line, "case" should read --the case--.

COLUMN 3, line 2, "two side" should read --two-side--;

line 8, "(A)" should read --(1)--;

line 56, "conveycr" should read --conveyor--.

COLUMN 5, line 22, "instantly" should read --is instantly--;

line 47, "afore-mentioned" should read --aforementioned--;

line 54, "normal" should read --normal- --.

UNITED STATES PATENT AND TRADEMARK OFFICE
CERTIFICATE OF CORRECTION

PATENT NO. : 4,727,398
DATED : February 23, 1988
INVENTOR(S) : TAKESHI HONJO, ET AL.

It is certified that error appears in the above-identified patent and that said Letters Patent is hereby corrected as shown below:

COLUMN 6, line1, "are" should read --is--.

COLUMN 7, line 6, "V2," should read --Va,--;
    line 28, "an" should read --a--;
    line 29, "afore-men-" should read --aforemen- --;
    line 43, "which a" should read --which there is a--;
    line 68, "normaldis-" should read --normal-dis- --.

COLUMN 8, line 2, "anor-" should read --a nor- --.

COLUMN 9, line 11, "I0" should be deleted.

COLUMN 10, line 17, "05" should read --O5--.

COLUMN 11, line 38, "contrcl" should read --control--;
    line 40, "40" should read --39--.

COLUMN 12, line 42, "mcde" should read --mode--; same line, "an" should read --a--;
    line 45, "an" should read --a--;

UNITED STATES PATENT AND TRADEMARK OFFICE
CERTIFICATE OF CORRECTION

PATENT NO. : 4,727,398

DATED : February 23, 1988

INVENTOR(S) : TAKESHI HONJO, ET AL.

It is certified that error appears in the above-identified patent and that said Letters Patent is hereby corrected as shown below:

COLUMN 12, line 47, "an" should read --a--;

line 52, "214." should read --MDCN.--.

COLUMN 13, line 18, "normal-feed-normal discharge" should read --normal-feed-normal-discharge--;

line 29, "tatle" should read --table--.

COLUMN 15, line 1, "controls" should read --control--.

COLUMN 16, line 9, "MICCW. CL" should read --MICCW, CL--;

line 25, "JCN11," should read --JCNII,--;

line 29, "off suspend" should read --off to suspend--;

line 67, "RJCN" should read --EJCN--.

COLUMN 17, line 51, "in" should read --on--.

COLUMN 19, line 13, "JCN6" should read --JCN6 is started--.

COLUMN 20, line 65, "Z5" should be deleted.

UNITED STATES PATENT AND TRADEMARK OFFICE
CERTIFICATE OF CORRECTION

PATENT NO. : 4,727,398

DATED : February 23, 1988

INVENTOR(S) : TAKESHI HONJO, ET AL.

It is certified that error appears in the above-identified patent and that said Letters Patent is hereby corrected as shown below:

COLUMN 21, line 5, "JCN6" should read --JCN6 is started--;

line 6, "counter" should read --counter EJCN--;

line 17, "of" should read --off--;

line 38, "Oll" should read --Oll--;

line 47, "of" should read --off--;

line 48, "Oll" should read --Oll--; same line, "JAM signal," (second occurrence) should be deleted.

COLUMN 22, line 11, "S0" should read --SO--;

line 16, "S0," should read --SO,--;

line 28, "S0CN" should read --SOCN--; same line, "SOCN = 3," should read --SOCN = 3,--.

COLUMN 23, line 10, "maticaly" should read --matically--;

line 18, "irverting" should read --inverting--;

line 22, "directior" should read --direction--.

COLUMN 24, line 42, "origiral," should read --original,--;

line 60, "stitch-back" should read --switch-back--.

UNITED STATES PATENT AND TRADEMARK OFFICE
CERTIFICATE OF CORRECTION

PATENT NO. : 4,727,398

DATED : February 23, 1988

INVENTOR(S) : TAKESHI HONJO, ET AL.

It is certified that error appears in the above-identified patent and that said Letters Patent is hereby corrected as shown below:

<u>COLUMN 25,</u> line 24, "a" should read --an--;

line 28, "am" should read --an--.

<u>IN THE DRAWING,</u>

Sheet 9, FIG. 14, "CLATCH"(85) should read --CLUTCH--.

Signed and Sealed this

Fifteenth Day of November, 1988

Attest:

DONALD J. QUIGG

Attesting Officer      Commissioner of Patents and Trademarks